(12) United States Patent
Erb

(10) Patent No.: US 9,193,313 B2
(45) Date of Patent: Nov. 24, 2015

(54) METHODS AND APPARATUSES INVOLVING FLEXIBLE CABLE/GUIDEWIRE/INTERCONNECTS

(71) Applicant: Cardia Access, Inc., Eden Prairie, MN (US)

(72) Inventor: John L. Erb, Wayzata, MN (US)

(73) Assignee: NuAx, Inc., Eden Prairie, MN (US)

( * ) Notice: Subject to any disclaimer, the term of this patent is extended or adjusted under 35 U.S.C. 154(b) by 452 days.

(21) Appl. No.: 13/849,334

(22) Filed: Mar. 22, 2013

(65) Prior Publication Data

US 2015/0266436 A1    Sep. 24, 2015

Related U.S. Application Data

(60) Provisional application No. 61/614,122, filed on Mar. 22, 2012, provisional application No. 61/614,162, filed on Mar. 22, 2012, provisional application No. 61/614,169, filed on Mar. 22, 2012.

(51) Int. Cl.
| | |
|---|---|
| *B62D 6/00* | (2006.01) |
| *B62D 11/00* | (2006.01) |
| *B62D 12/00* | (2006.01) |
| *B63G 8/20* | (2006.01) |
| *B63H 25/04* | (2006.01) |
| *G05D 1/00* | (2006.01) |
| *G06F 7/00* | (2006.01) |
| *G06F 17/00* | (2006.01) |
| *G06F 19/00* | (2011.01) |
| *B60R 16/023* | (2006.01) |
| *G07C 5/00* | (2006.01) |
| *H04B 10/25* | (2013.01) |
| *H04L 12/933* | (2013.01) |
| *H04L 12/28* | (2006.01) |
| *G02B 6/02* | (2006.01) |

(52) U.S. Cl.
CPC .............. *B60R 16/0231* (2013.01); *G07C 5/00* (2013.01); *H04B 10/2503* (2013.01); *H04L 12/28* (2013.01); *H04L 49/15* (2013.01)

(58) Field of Classification Search
CPC ................................ H04L 12/28; H04L 49/15
USPC .............................................. 701/41; 385/123
See application file for complete search history.

(56) References Cited

U.S. PATENT DOCUMENTS 3,980,806 A    9/1976  May
4,276,144 A    6/1981  Hahn (Continued)

*Primary Examiner* — Helal A Algahaim
*Assistant Examiner* — Mahmoud Ismail
(74) *Attorney, Agent, or Firm* — John M. Berns

(57) ABSTRACT

Various embodiments of the present disclosure are directed toward apparatus and methods including communication circuits for communicating between a plurality of compartments in a vehicle. An array of flexible cables provides signal-communication paths between the plurality of compartments in the vehicle, with each cable having a glass or silica core region for conveying optical signals, and communicating signals (electrical signals and optical signals) along at least one of the signal-communication paths and between the plurality of compartments in the vehicle. The apparatus and methods also include a plurality of circuits that communicate status-indication signals between locations along the array of flexible cables. The status-indication signals are communicated via the signal-communication paths in the flexible array of cables and are indicative of vehicle-travel modes for reporting a status of the vehicle in a mode relative to travel of the vehicle.

20 Claims, 27 Drawing Sheets

(56) References Cited

U.S. PATENT DOCUMENTS

| | | | |
|---|---|---|---|
| 4,407,561 | A | 10/1983 | Wysocki |
| 4,408,604 | A | 10/1983 | Hirshorn et al. |
| 4,418,984 | A | 12/1983 | Wysocki et al. |
| 4,575,187 | A | 3/1986 | Howard et al. |
| 4,785,815 | A | 11/1988 | Cohen |
| 4,791,575 | A | 12/1988 | Watts, Jr. et al. |
| 4,798,206 | A | 1/1989 | Maddison et al. |
| 4,873,989 | A | 10/1989 | Einzig |
| 4,896,209 | A * | 1/1990 | Matsuzaki et al. ............... 725/12 |
| 4,911,712 | A | 3/1990 | Harrington |
| 5,117,828 | A | 6/1992 | Metzger et al. |
| 5,218,171 | A | 6/1993 | Aldissi |
| 5,433,744 | A | 7/1995 | Breyen et al. |
| 5,463,138 | A | 10/1995 | Muller |
| 5,500,012 | A | 3/1996 | Brucker et al. |
| 5,531,779 | A | 7/1996 | Dahl et al. |
| 5,750,930 | A | 5/1998 | Buck et al. |
| 6,104,961 | A | 8/2000 | Conger et al. |
| 6,129,685 | A | 10/2000 | Howard |
| 6,167,314 | A | 12/2000 | Fischer et al. |
| 6,178,356 | B1 | 1/2001 | Chastain et al. |
| 6,195,411 | B1 | 2/2001 | Dinsmore |
| 6,319,188 | B1 | 11/2001 | Lovoi |
| 6,356,791 | B1 | 3/2002 | Westlund et al. |
| 6,366,819 | B1 | 4/2002 | Stokes |
| 6,456,888 | B1 | 9/2002 | Skinner et al. |
| 6,564,107 | B1 | 5/2003 | Bodner et al. |
| 6,697,676 | B2 | 2/2004 | Dahl et al. |
| 6,711,443 | B2 | 3/2004 | Osypka |
| 6,792,316 | B2 | 9/2004 | Sass |
| 6,849,074 | B2 | 2/2005 | Chen et al. |
| 6,879,861 | B2 | 4/2005 | Benz et al. |
| 6,930,242 | B1 | 8/2005 | Helfer et al. |
| 7,010,356 | B2 | 3/2006 | Jog et al. |
| 7,077,837 | B2 | 7/2006 | Sahagian |
| 7,079,902 | B2 | 7/2006 | Soukup et al. |
| 7,137,395 | B2 | 11/2006 | Fried et al. |
| 7,231,260 | B2 | 6/2007 | Wallace et al. |
| 7,420,124 | B2 | 9/2008 | Michael et al. |
| 7,519,432 | B2 | 4/2009 | Bolea et al. |
| 7,775,833 | B1 * | 8/2010 | Le et al. .................... 439/620.08 |
| 7,865,044 | B2 | 1/2011 | Farhadiroushan et al. |
| 7,883,536 | B1 | 2/2011 | Bendett et al. |
| 7,917,213 | B2 | 3/2011 | Bulkes et al. |
| 8,000,808 | B2 | 8/2011 | Hegland et al. |
| 2001/0055904 | A1 | 12/2001 | Sawada et al. |
| 2002/0052636 | A1 | 5/2002 | Bardy et al. |
| 2002/0183818 | A1 | 12/2002 | Williams et al. |
| 2002/0189845 | A1 | 12/2002 | Gorrell |
| 2003/0077935 | A1 | 4/2003 | Stein et al. |
| 2003/0195602 | A1 | 10/2003 | Boling |
| 2003/0195603 | A1 | 10/2003 | Scheiner |
| 2003/0227395 | A1 * | 12/2003 | Zeineh .......................... 340/988 |
| 2004/0024440 | A1 | 2/2004 | Cole |
| 2004/0064174 | A1 | 4/2004 | Belden |
| 2004/0122499 | A1 | 6/2004 | Westlund |
| 2004/0243210 | A1 | 12/2004 | Morgan et al. |
| 2005/0090885 | A1 | 4/2005 | Harris et al. |
| 2005/0096720 | A1 | 5/2005 | Sharma et al. |
| 2005/0103932 | A1 * | 5/2005 | Huynh ........................ 244/75 R |
| 2006/0009830 | A1 | 1/2006 | Atkinson et al. |
| 2006/0095105 | A1 | 5/2006 | Jog et al. |
| 2006/0106443 | A1 | 5/2006 | Michael et al. |
| 2006/0293741 | A1 | 12/2006 | Johnson et al. |
| 2007/0067000 | A1 | 3/2007 | Strother et al. |
| 2007/0088208 | A1 | 4/2007 | Yasuzawa et al. |
| 2007/0088417 | A1 | 4/2007 | Schouenborg |
| 2007/0288077 | A1 | 12/2007 | Bulkes et al. |
| 2007/0293923 | A1 | 12/2007 | Soltis et al. |
| 2008/0015625 | A1 | 1/2008 | Ventura et al. |
| 2008/0039916 | A1 | 2/2008 | Colliou et al. |
| 2008/0077220 | A1 | 3/2008 | Reddy |
| 2008/0097567 | A1 | 4/2008 | Haldeman |
| 2008/0183257 | A1 | 7/2008 | Imran et al. |
| 2008/0217587 | A1 | 9/2008 | Gaudiana et al. |
| 2008/0255629 | A1 | 10/2008 | Jenson et al. |
| 2008/0310848 | A1 * | 12/2008 | Yasuda et al. ................. 398/115 |
| 2009/0204193 | A1 | 8/2009 | Kokones et al. |
| 2009/0299446 | A1 | 12/2009 | Lovoi et al. |
| 2010/0057179 | A1 | 3/2010 | Storey |
| 2010/0114271 | A1 | 5/2010 | Sommer et al. |
| 2010/0182023 | A1 | 7/2010 | Pena et al. |
| 2010/0183269 | A1 | 7/2010 | Mahapatra et al. |
| 2010/0278491 | A1 | 11/2010 | Noddings |
| 2011/0220408 | A1 | 9/2011 | Walsh et al. |
| 2011/0245714 | A1 | 10/2011 | Volckaerts |
| 2011/0301657 | A1 * | 12/2011 | Walsh et al. ....................... 607/5 |
| 2012/0269208 | A1 * | 10/2012 | Grohlich et al. ............. 370/536 |
| 2012/0277600 | A1 | 11/2012 | Greenhut |
| 2013/0018537 | A1 * | 1/2013 | Arad ............................... 701/22 |
| 2013/0041447 | A1 | 2/2013 | Erb et al. |

\* cited by examiner

METHODS AND APPARATUSES INVOLVING FLEXIBLE CABLE/GUIDEWIRE/INTERCONNECTS

RELATED DOCUMENTS

This patent document claims benefit under 35 U.S.C. §119 to U.S. Provisional Patent Applications, Ser. No. 61/614,122 entitled "CABLE/GUIDEWIRE/INTERCONNECTS COMMUNICATION APPARATUS AND METHODS," Ser. No. 61/614,162 entitled "METHODS AND APPARATUSES INVOLVING FLEXIBLE CABLE/GUIDEWIRE/INTERCONNECTS," and Ser. No. 61/614,169 entitled "METHODS OF MANUFACTURE, USES AND RELATED APPARATUSES INVOLVING FLEXIBLE CABLE/GUIDEWIRE/INTERCONNECTS," each of which was filed on Mar. 22, 2012. These provisional patent documents and appendices filed therewith are incorporated herein by reference generally, and specifically for its corresponding teachings as is apparent, for example, in connection with the common figures.

BACKGROUND

Reliable and rapid communication of data in terrain and aerospace vehicles is important to ensure accurate reporting of various vehicle or aircraft conditions. For instance, in order to properly and safely operate an aircraft, a pilot or remote operator is typically provided with updates on the various operational status of the personnel, passengers, and or mechanical moving parts of the vehicle. These are but a few of the many types of tangibles and operational modes that can be considered important. Communication can be difficult in these apparatuses because of harsh environmental conditions and difficulty in routing channels of communication.

Other issues include concerns with other modes of operation in light of such status as well as increased weight and space limitations when attempting to accommodate the desire to monitor the various aspects of such vehicles. These and other matters have presented challenges to communication circuitry and channels of communication, for a variety of applications.

SUMMARY

Various example embodiments are directed to communication circuitry for a moveable vehicle (e.g., airplane, unmanned aircraft, all-terrain vehicle, automobile) that includes at least one flexible cable and its implementation. The flexible cables can be provided in an array such as a mesh type arrangement to provide a large surface area of coverage of an area or portion of a vehicle, or the array can be formed over or portions of the moveable apparatus or all of the moveable apparatus. Communication is carried out between remote locations of the vehicle (where communication circuitry is located) using the flexible cable(s), and can include both optical and electrical signals. Because the cables are provided throughout the vehicle, and often over long distances, it can be desirable to connect portions of a single cable together, or connect multiple cables together. Thus, various aspects of the present disclosure are also directed toward interconnects that mechanically secure portions of the cable, and also couple signals (both electrical and optical signals) that are carried thereon.

Various aspects of the present disclosure are directed toward apparatus and methods including a communication circuit for communicating between a plurality of compartments in a vehicle. These apparatus and methods utilize an array of flexible cables to provide signal-communication paths between the plurality of compartments in the vehicle. Each cable includes a glass or silica core region for conveying optical signals, and each communicates signals along at least one of the signal-communication paths and between the plurality of compartments in the vehicle. The signals communicated include electrical signals and optical signals. Also included in the methods and apparatus of the present disclosure are a plurality of circuits. The plurality of circuits include a first circuit located at a proximate location along the array of flexible cables, and secondary circuits located at distal locations along the array of flexible cables. The plurality of circuits communicate status-indication signals between the locations along the array of flexible cables. The status-indication signals are communicated via the signal-communication paths in the flexible array of cables and are indicative of a first vehicle-travel mode for reporting a status of the vehicle in a mode relative to travel of the vehicle. The first circuit receives the status-indication signals from the secondary circuits. In response to the receipt of the status-indication signals, the first circuit reports or analyzes the vehicle based on the status of the vehicle, as indicated at the distal locations, for a mode relative to travel of the vehicle.

Various embodiments of the present disclosure are also directed toward apparatus and methods including communication circuit for communicating between a plurality of compartments in an unmanned aerial vehicle. In such embodiments, the status-indication signals are communicated via the signal-communication paths in the flexible array of cables, and are indicative of the status of the compartments of the vehicle while the vehicle is airborne and without user-visual monitoring capabilities.

The above discussion/summary is not intended to describe each embodiment or every implementation of the present disclosure. The figures and detailed description that follow also exemplify various embodiments.

BRIEF DESCRIPTION OF THE FIGURES

Various example embodiments may be more completely understood in consideration of the following detailed description in connection with the accompanying drawings, in which.

Figure 1:
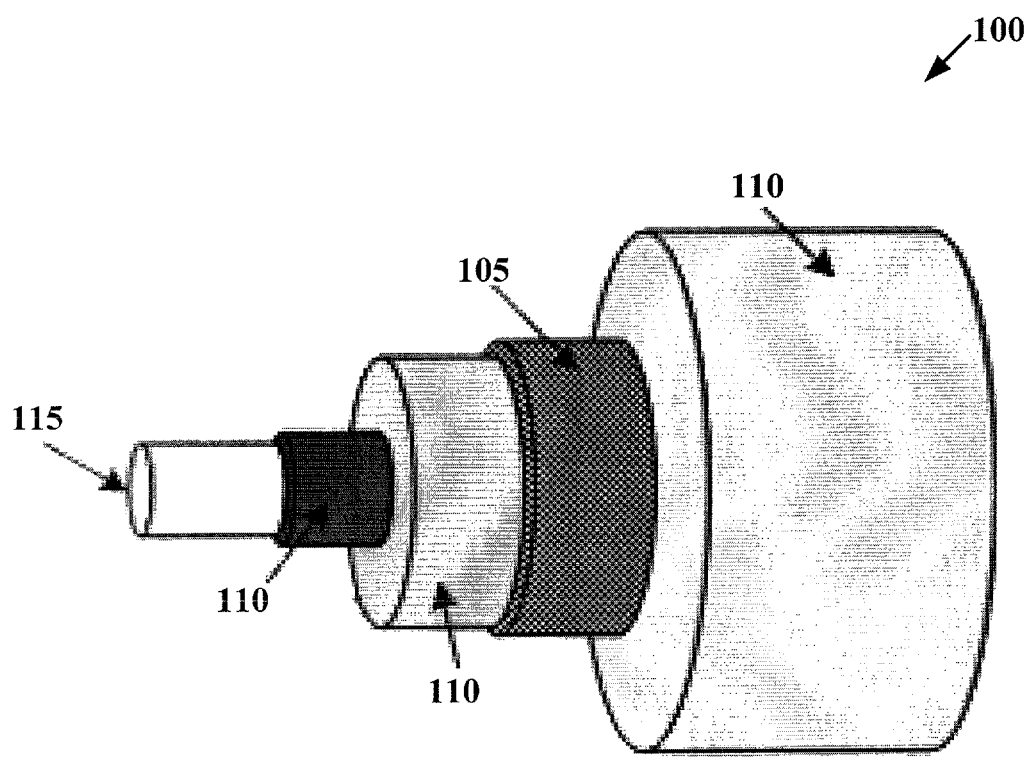
FIG. 1 depicts an example embodiment for a flexible and durable wire, consistent with various embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention including aspects defined in the claims. In addition, the term "example" as used throughout this application is only by way of illustration, and not limitation.

DETAILED DESCRIPTION

Aspects of the present invention are believed to be applicable to a variety of different types of apparatus, methods and arrangements directed to communication circuitry for a moveable vehicle (e.g., airplane, unmanned aircraft, all-terrain vehicle, automobile) that includes at least one flexible cable. While the present invention is not necessarily so limited, various aspects of the invention may be appreciated through a discussion of examples using this context.

Various example embodiments are directed toward apparatus and methods including a communication circuit for communicating between a plurality of compartments in a vehicle. These apparatus and methods utilize an array of flexible cables to provide signal-communication paths between the plurality of compartments in the vehicle. Each cable includes a glass or silica core region for conveying optical signals, and each communicates signals along at least one of the signal-communication paths and between the plurality of compartments in the vehicle. The signals communicated include electrical signals and optical signals. Also included in the methods and apparatus of the present disclosure are a plurality of circuits. The plurality of circuits include a first circuit located at a proximate location along the array of flexible cables, and secondary circuits located at distal locations along the array of flexible cables. The plurality of circuits communicate status-indication signals between the locations along the array of flexible cables. The status-indication signals are communicated via the signal-communication paths in the flexible array of cables and are indicative of a first vehicle-travel mode for reporting a status of the vehicle in a mode relative to travel of the vehicle. The first circuit receives the status-indication signals from the secondary circuits. In response to the receipt of the status-indication signals, the first circuit reports or analyzes the vehicle based on the status of the vehicle, as indicated at the distal locations, for a mode relative to travel of the vehicle.

Various embodiments of the present disclosure are also directed toward apparatus and methods including a communication circuit for communicating between a plurality of compartments in an unmanned aerial vehicle. In such embodiments, the status-indication signals are communicated via the signal-communication paths in the flexible array of cables, and are indicative of the status of the compartments of the vehicle while the vehicle is airborne and without user-visual monitoring capabilities.

In certain embodiments, the glass or silica core region has a physical characteristic that is limited by an outer dimension that is less than 750 microns and also a conductive cladding surrounding the core region. Additionally, in other embodiments, the status-indication signals are indicative of an operating function of one or more of: functionality of exterior control surfaces of the vehicle, positioning of wing flaps of the vehicle, alignment of control surfaces of the vehicle, atmospheric conditions of critical surfaces of the vehicle, and position of wheels of the vehicle. Further, in certain embodiments of the present disclosure, the status-indication signals are indicative of seating status of passengers in the vehicle.

Moreover, in certain embodiments of the present disclosure, the vehicle-travel mode is at least one of a steady-state movement mode of the vehicle, an acceleration mode of the vehicle, and a deceleration mode of the vehicle. Additionally, in certain embodiments, the vehicle is an all-terrain-vehicle or an automobile in which the first circuit collects vehicle-safety data regarding the status of vehicle while the vehicle or automobile is traveling. The vehicle can also be an unmanned aerial vehicle or a manned aircraft vehicle in which the first circuit collects vehicle-safety data regarding the status of vehicle while the unmanned aerial vehicle or a manned aircraft vehicle is traveling. Further, the signal-communication paths, of various embodiments of the present disclosure, can pass redundant status-indication signals of mechanical aspects of the vehicle. In other embodiments, the signal-communication paths pass complimentary status-indication signals of mechanical aspects of the vehicle. The signal-communication paths can also provide a two-way data pathway.

In certain embodiments of the present disclosure, each cable includes at least one electrically exposed portion, and the cables detect conductive changes in a material of the cable in contact with the at least one electrically exposed portion. In these embodiments, the conductive changes can be indicative of unwanted moisture. Additionally, certain embodiments of the present disclosure include cables that have at least one optically exposed portion. In these embodiments, the cable detects optical changes in the cable in contact with the at least one optically exposed portion. In other embodiments, the secondary circuits are arranged with mechanical aspects of the vehicle, and communicate status-indication signals of the mechanical aspects.

Various aspects of the present disclosure are directed toward a flexible and durable fine wire electrical conductor, termed a cable or wire. The electrical conductor used to fabricate a lead is formed from a drawn silica, glass, or sapphire crystalline quartz fiber core, herein referred to collectively as a glass fiber, with a conductive metal buffer cladding on the core. For either a metallized glass or polymer fiber, the structure can also be enhanced by incorporating a polymer coating over the metal buffer cladding, which may provide a biocompatible surface resistant to environmental stress cracking or other mechanism of degradation associated with exposure and flexure within a biological system. In certain embodiments, the polymer coating may serve simply as an electrical insulation. In an alternative embodiment, a polymer fiber core is configured to serve as a substrate for metallization instead of a glass fiber. In this embodiment, a relatively inelastic but flexible polymer is chosen such that the polymer fiber core is relatively resistant to tensile forces, but can bend in a manner to enable application in non-linear configurations.

Metallization may be done on a polymer fiber during the process of creating the polymer core-typically extrusion. Alternatively, the polymer may be metallized in a separate step following extrusion. Hermetic sealing of the polymer core by metallization may or may not be necessary, depending on the polymer and intended application of the electrically conductive product. Various means of metallization suitable for polymer substrates are known in the art such as integration of the metal into the polymer surface in order to achieve desired adhesion of metal to the polymer. As for the case of glass fibers, metallization of polymer may involve initial laying down of one thin metal coating using a metal known to result in good adhesion of metal to polymer, followed by a second metal coating. In this approach, the first metal layer may not have good electrical conductivity, but its primary purpose is to provide a strong adhesion to polymer, and a metal surface suitable for laying down a second metal layer with desired electrical conductivity characteristics. In additional embodiments, metals may be mixed directly with glass or silica or polymer core substrates to produce electrically conductive fibers.

The outer diameter of the electrical conductor preferably is less than about 750 microns, and may be 200 microns or even as small as 50 microns. Metals employed in the buffer can include aluminum, silver, gold, platinum, titanium, tantalum, gallium, or others, as well as metal alloys of which MP35N, a nickel-cobalt based alloy platinum-iridium, and gallium-indium are examples. In certain embodiments, the metal cladding is aluminum, silver, or gold, applied to the glass fiber core. This may include immediate application upon drawing the fiber, or may involve application of metal to a pre-formed glass fiber by one of several processes including chemical or physical vapor deposition, or electroplating.

Metallization of the glass fiber provides a protective hermetic seal over the fiber surface. Alternatively, the glass fiber can be hermetically sealed with carbon or polymer following drawing of the fiber, the surface of which can then be metalized by one of the processes previously mentioned. This embodiment is further detailed below.

For applications in which delivery of high voltage or current is needed, multiple fibers can be used in parallel. For instance, for a metallized glass fiber of given length, for example, approximately 36 inches, and an overall electrical circuit of a given resistance, say 100 ohms, capable of supporting a 25 millisecond exponential pulse of 1500 volts, the peak current load would be 15 amps, based on Ohms law. If an electric pulse of greater amplitude is required, say 30 amps, then two or more metallized glass fibers can be electrically coupled in parallel to provide a current path capable of supporting an electric pulse of 30 amps.

Alternatively, the glass fiber can be fabricated as a dielectric with a metal wire in the center of the glass fiber core as one electrical conductor, and a metallic buffer layer applied on the outside of the glass fiber core, both protecting the fiber and acting as a coaxial second conductor or ground return.

In other embodiments, a further layer of silica, glass, etc. (as above) covers the metallic cladding, with a further electrically conductive buffer covering that dielectric layer. This embodiment may be with or without a center wire in the inner fiber. These silica, glass, etc. layers and buffer coatings can be continued for several more layers to produce a multiple conductor cable. In a further embodiment the center of the fiber core is hollow to increase flexibility of a lead of a given diameter. In still a further embodiment, multiple conductors are embedded separately side-by-side in the glass fiber core, where the glass serves to electrically insulate the conductors from each other.

In an additional embodiment, an electrical conductor is composed of many smaller metal-buffered or metal wire-centered glass fibers that together provide the electrical connection. This embodiment allows for high redundancy for each connection and very high flexibility. Additional embodiments differ from the aforementioned embodiments in that metal is not necessarily applied directly to the glass fiber. As mentioned previously, a non-metal buffer such as carbon and/or polymer may be applied directly to the glass fiber core to form a protective hermetic seal layer on the fiber. Metal can then be deposited upon the carbon and/or polymer in a subsequent step. Such a metal deposition process may conveniently take place through a batch process, or via a continuous deposition process, in which carbon—and/or polymercoated fiber is moved continuously through a deposition chamber during the metal deposition process. Such metal deposition may be carried out by vapor deposition, electroplating—especially upon an electrically conductive carbon surface, by coating with an electrically conductive ink, or by one of numerous other metal deposition processes known in the art. In the case of vapor deposition and related processes governed by line-of-sight considerations, one or more metal targets—sources for vaporized metal, may be positioned within the metal deposition chamber in such a way as to ensure overlap and complete 360 degree coverage of the fiber during the metal deposition process. Alternately, the fiber may be turned or rotated within the vapor deposition field to ensure complete and uniform deposition. Vapor deposition processes are typically carried out in an evacuated chamber at low atmospheric pressure (approximately $1.0 \times 10^{-6}$ torr).

After evacuation is attained, the chamber is backfilled with a plasma-forming gas, typically argon, to a pressure of $2.0 \times 10^{-3}$ torr. Masking may be pre-applied to the carbon and/or polymer surface to enable a patterned coating of metal on the carbon and/or polymer surface. Such a pattern may be useful for creating two or more separate electrically conductive paths along the length of the electrical conductor, thus enabling fabrication of a bipolar or multipolar conductor upon a single electrical conductor Inherent in the concept of a metallized electrical conductor according to this invention is the ability to use more than one metal in the construction of such electrical conductors. For instance, an initial metal may be deposited on the basis of superior adhesion to the carbon and/or polymer underlayment. One or more additional metals or metal alloys could then be deposited on the first metal. Intent of the second metal would be to serve as the primary conductive material for carrying electrical current.

The completed metallized electrical conductor may then be conveniently coated with a thin polymeric material, such as Teflon to provide insulation and/or lubriciousness. Also, polyurethane or silicone or other insulative polymers may conveniently be used as jacketing material, providing biocompatibility and protection from the external environment. A coaxial iteration of this embodiment incorporating two independent electrical conductors may be constructed in which a metal electrical conductor is embedded within the central glass or silica core, with the second conductor being applied to the carbon and/or polymer buffer residing on the outer surface of the glass or silica core. In an additional embodiment of metal cladding for the glass fiber, temporary sealing materials may be applied to the glass fiber for protection. Subsequent steps carried out in a controlled environment facilitate removal of the temporary sealing materials, followed by resurfacing the fiber with metal or other material, such as polymer or carbon. Such steps enable controlled metal surfaces to be applied directly to the glass fiber, if so desired. Temporary sealing materials may consist of polymers, carbon, or metals, which are chosen ease of removal. In the case of polymers, removal may be facilitated by dissolution in appropriate solvent, heat, alteration in pH or ionic strength, or other known means of control. Carbon and metals may be removed by chemical or electrochemical etching, heating, or other known means of control.

As indicated previously, various metals or metal alloys may be suitable for employment as a permanently deposited electrical conductor of this invention. Idealized properties include excellent electrical conductivity with low electrical resistance, resistance to corrosion, or heat, which may be employed at various steps during the electrical conductor manufacturing process. Additional resistance to exposure to cold, vacuum, vibration, and cyclic bending fatigue represent desired characteristics.

Estimated metal cross sectional area for a desired electrical resistance may be determined theoretically from the following relationship: $R = p*(1/A)$, where R=resistance (ohms), p metal resistivity (ohms-cm), 1=conductor length (cm) and A=cross sectional area of conductor. Thus, desired resistance is equal to the product of resistivity and the quotient of length and cross-sectional area. For some applications of the electrical conductor of this invention, desired electrical resistance may be on the order of 50 ohms. Using silver as an example, resistivity is $1.63 \times 10^{-6}$ ohms-cm. Thus, a silver conductor of approximately 1000 nm thickness would provide the desired electrical resistance for an electrical conductor of approximately 0.015 cm diameter and 80 cm length.

Various aspects of the present disclosure contemplate cables (meaning glass fiber incorporating one or more electrical conductors) of as little as 100 to 200 micron diameter, or as large as 750 microns or more in diameter, and even unipolar electrical conductors as small as 50 microns in diameter or even smaller. These small diameter electrical conductors have significant flexibility with an achievable bend radius of less than 1 mm, to provide placement in tortuous tracts.

The multipolar electrical conductor representing one embodiment of this invention adapts technologies that have been developed for various disparate applications. Glass fiber is produced from a draw tower, a furnace that melts the silica or glass (or grown crystals for the sapphire and quartz) and allows the fiber to be pulled, "drawn," vertically from the bottom of the furnace. Fibers produced in this manner have strength of over 1 Mpsi. If the drawn fiber is allowed to sit in normal atmospheric conditions for more than a few minutes, its strength will rapidly be reduced to the order of 2-10 kpsi. This reduction is caused by water vapor attack on the outer silica or glass surface, causing minute cracking Bending the silica or glass fiber causes the outside of the bend to be put into tension and the cracks to propagate across the fiber causing failure. To ensure that the fiber remains at its maximum strength, a buffer is added to fibers as they are drawn. As the fiber is drawn and cools, a plastic coating, the buffer, is applied in a continuous manner protecting the fiber within a second of being produced.

For further discussion of cables and wires, consistent with various aspects of the present disclosure, reference can be made to Appendices D and E of the underlying provisional applications, which are incorporated by reference. Additionally, the above discussion of cables and wires is applicable to various ones of the below discussed figures.

FIG. 1 depicts one embodiment for a flexible and durable wire 100 consistent with various embodiments of the present disclosure. The metal conductive layer 105 is shown as a single conductor. In other implementations, this conductor 105 is manufactured as an elongated/segmented conductor 105 that runs to provide two or more separate conductors (e.g., for redundancy, feedback and related "cable smart" applications). One or more additional layers 110 (e.g., polyamide cladding, carbon hermetic seal layer), or partial layers, can be included for self-sealing of micro-cracked (optically or electrically) conductive layers 105. For example, in response to externally-applied heat or internal heat generated by electrical current (e.g., with or without additional resistive elements generating heat therefrom). Processes for identifying the location of such micro-cracks include signal feeds with responsive sensing for testing electrical shorts on a DC current basis and using AC current approaches, impedance reflection analyses. The flexible and durable wire 100 includes a glass or silica core 115 that provides flexibility to the wire 100 such that it can bend approximately about 8 to 10 times the fiber core diameter 115 without damage.

Figure 2:
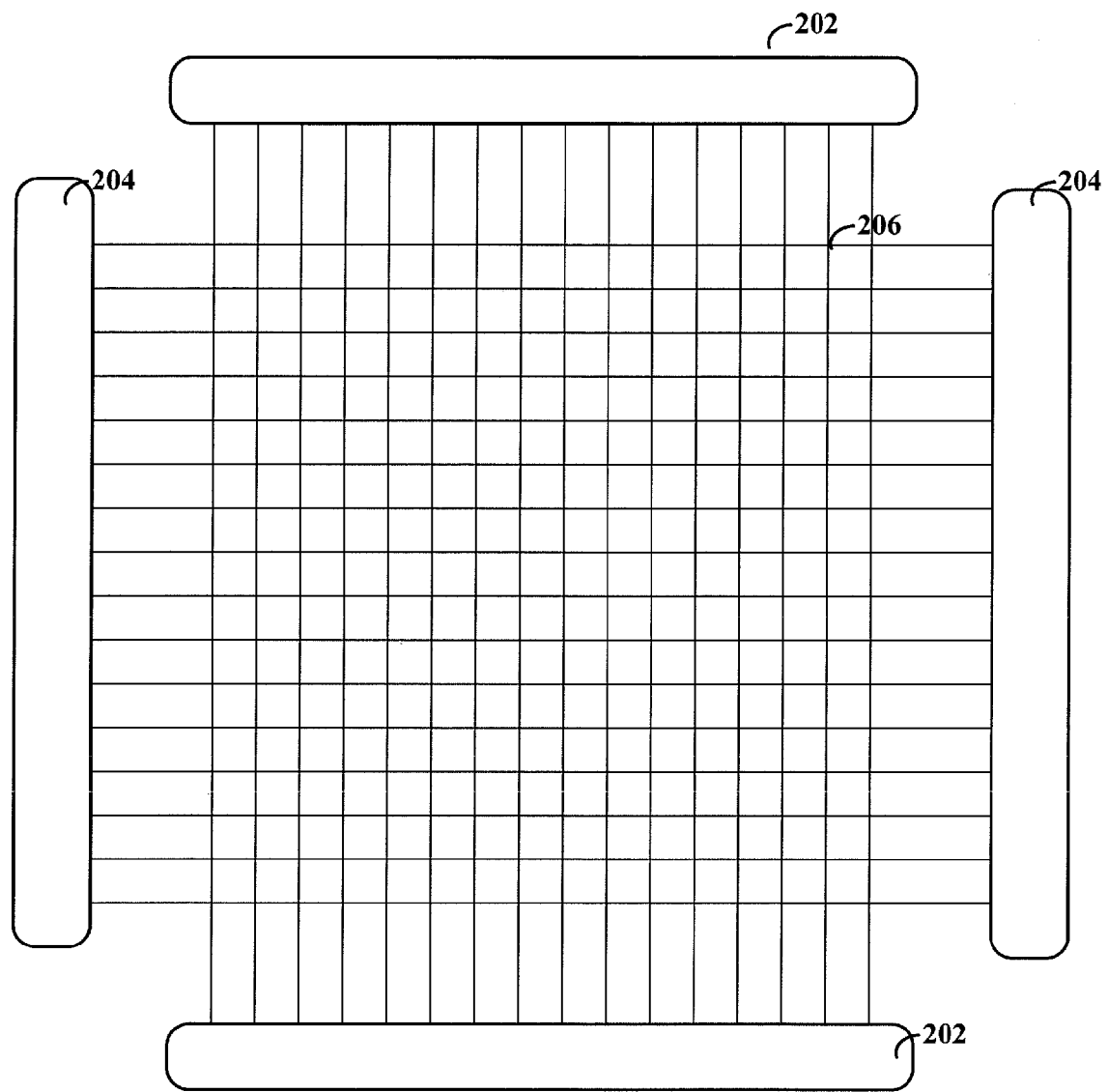
FIG. 2 depicts a mesh layout of flexible and durable wires including vertical communications circuits and horizontal communications circuits, consistent with various embodiments of the present disclosure.

FIG. 2 depicts a mesh layout that includes vertical communications circuits 202 and horizontal communications circuits 204. Depending upon the application, the circuits can be designed to transmit and/or receive signals. The mesh is depicted as being straight line-connections between communications circuits, however, the use of the flexible and durable wires discussed herein to form the mesh layout allows for the mesh to be used in connection with non-linear mesh layouts, deformable structures, moveable structures and other variations. For instance, a mesh layout could be fixed to (or made an integral part of) an aeronautical component that has significant curvatures, and that may be subject to movement and/or significant environmental stresses. The mesh could then be used to monitor the structural integrity of the component by detecting any breaches in the mesh.

For instance, the communication circuits can be used to detect a break in one or more of the flexible and durable wires by transmitting and receiving electrical signals along the wires. Alternatively and/or in addition, optical signals can be transmitted through the wires. The transmitted signals can then be used to detect a broken wire, indicating that the mesh has been breached. Coordinating between the vertical and horizontal wires, a specific location for the breach can be determined.

In some instances, one or more cross points 206 can connect (electrically and/or optically) vertical and horizontal wires. The communication signals can be indexed using the communication circuits to selectively activate/communicate on different wires. The connection points can be designed using a variety of different mechanisms including, but not necessarily limited to, removal of insulating material to allow direct contact between electrical conductive layers (with possible laser welds, conductive adhesive or the like) and the use of physical (intelligent) connectors as discussed in more detail herein.

In some instances multiple wires can span a single connection between the communications circuits 202, 204. The multiple wires can be connected at intermediate point(s) to allow communication to pass between the communication circuits 202, 204.

In certain instances intelligent connection device(s) can be located at intermediate point(s). For instance, sensors can be located at intermediate points and data from the sensor can be retrieved at/by communications circuits 202, 204. The use of a mesh array allows for indexing of the individual sensors.

In certain embodiments, each depicted line can represent multiple different wires, e.g., where the wires are bundled together. The wires within such a bundle can carry a common signal, or they can be individually addressable depending upon the application and design.

Figure 3:
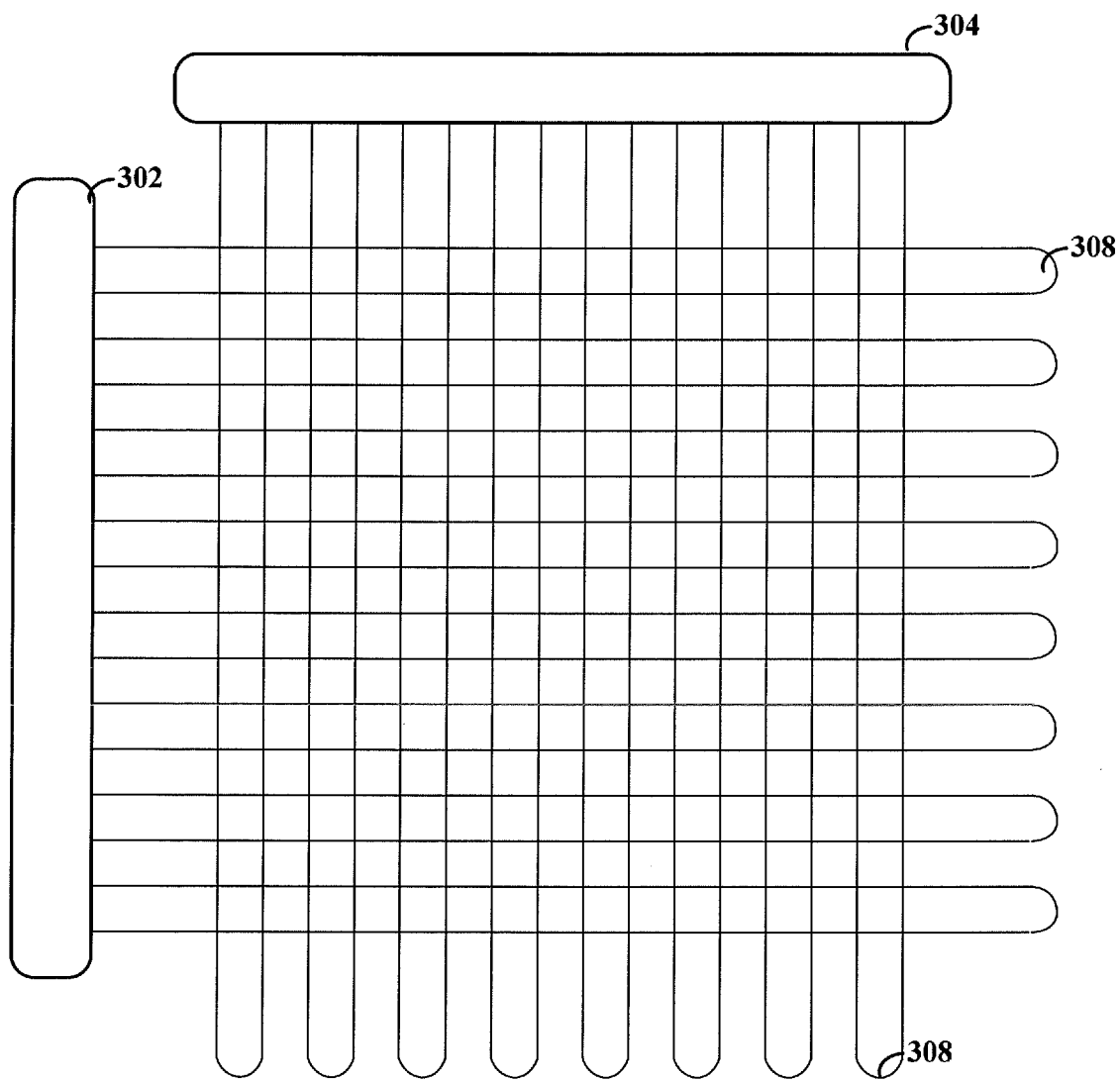
FIG. 3 depicts a mesh layout with a return path for flexible and durable wires, consistent with various embodiments of the present disclosure.

FIG. 3 depicts a mesh layout with a return path for the flexible and durable wires. As shown by points 308, both ends of the wires can be connected to a common communications device 302, 304. This can be useful where, for example, the far end (near 308) of the wire mesh is not readily available for placement or use of a communications device. For instance, the wire mesh may be placed upon a structure that is tethered at one or more points, but is otherwise free to move. For example, the structure may be free to float in a liquid or to move with air flow. In some embodiments of the present disclosure, the communications devices 302, 304 can be implemented at a common location, which can allow for even more freedom of movement. The mesh structure having crossed wires can be maintained (if desired) through careful routing of the wires.

Figure 4:
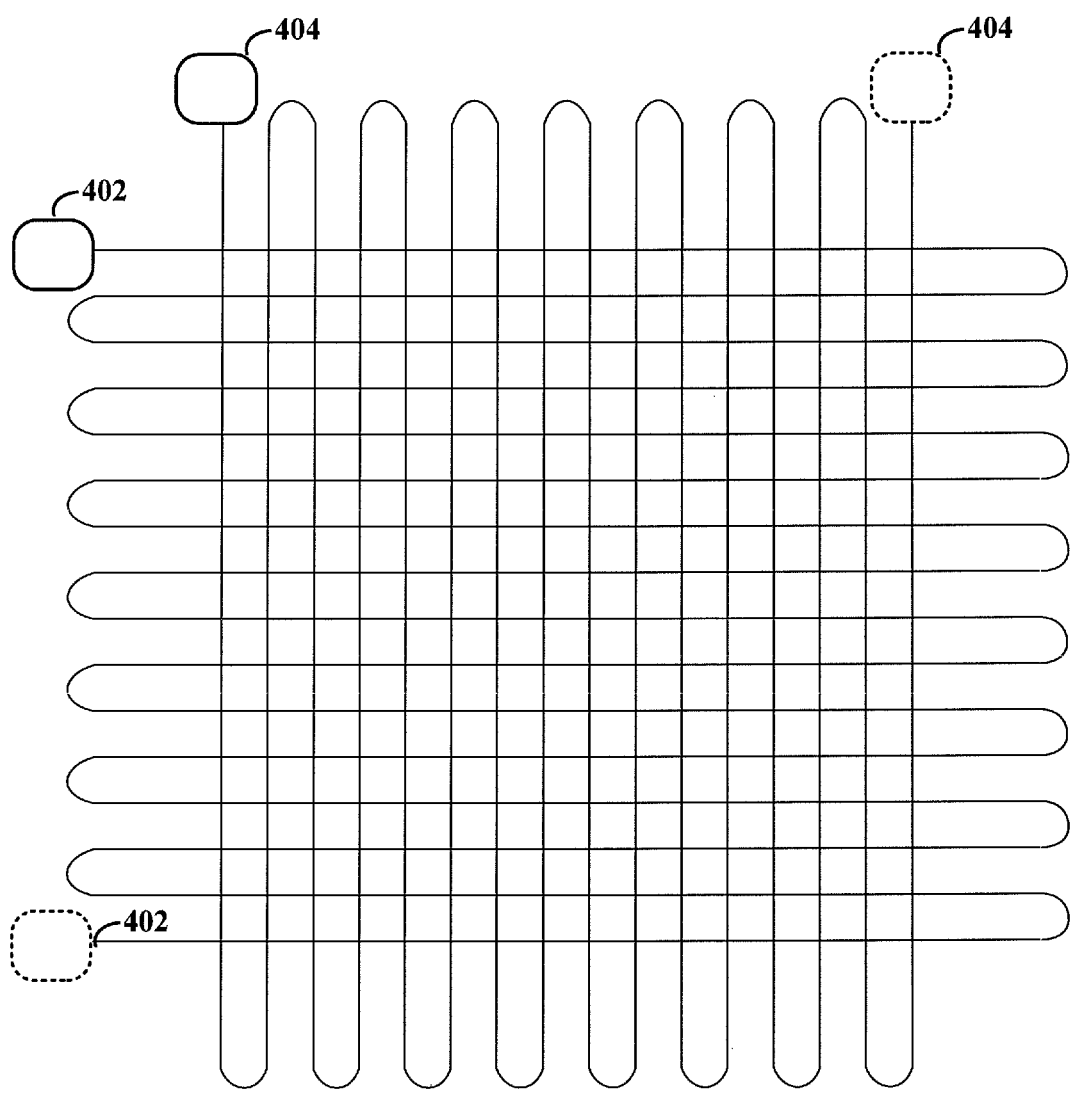
FIG. 4 depicts a mesh layout with two continuous runs of flexible and durable wires providing a mesh layout, consistent with various embodiments of the present disclosure.

FIG. 4 depicts a mesh layout with two continuous runs of wire providing the mesh layout. The different communications structures 402, and 404 can be attached to each end of the wires (similar to the discussion of FIG. 2) or a single communications structure can be attached either to both ends (similar to the discussion of FIG. 3) or a single end.

In certain instances, one or more of the above mesh layouts can be used in connection with a flexible fabric. This flexible fabric can include, but is not limited to, fabrics within vehicles (e.g., automotive, aeronautical, naval) and clothing.

Figure 5:
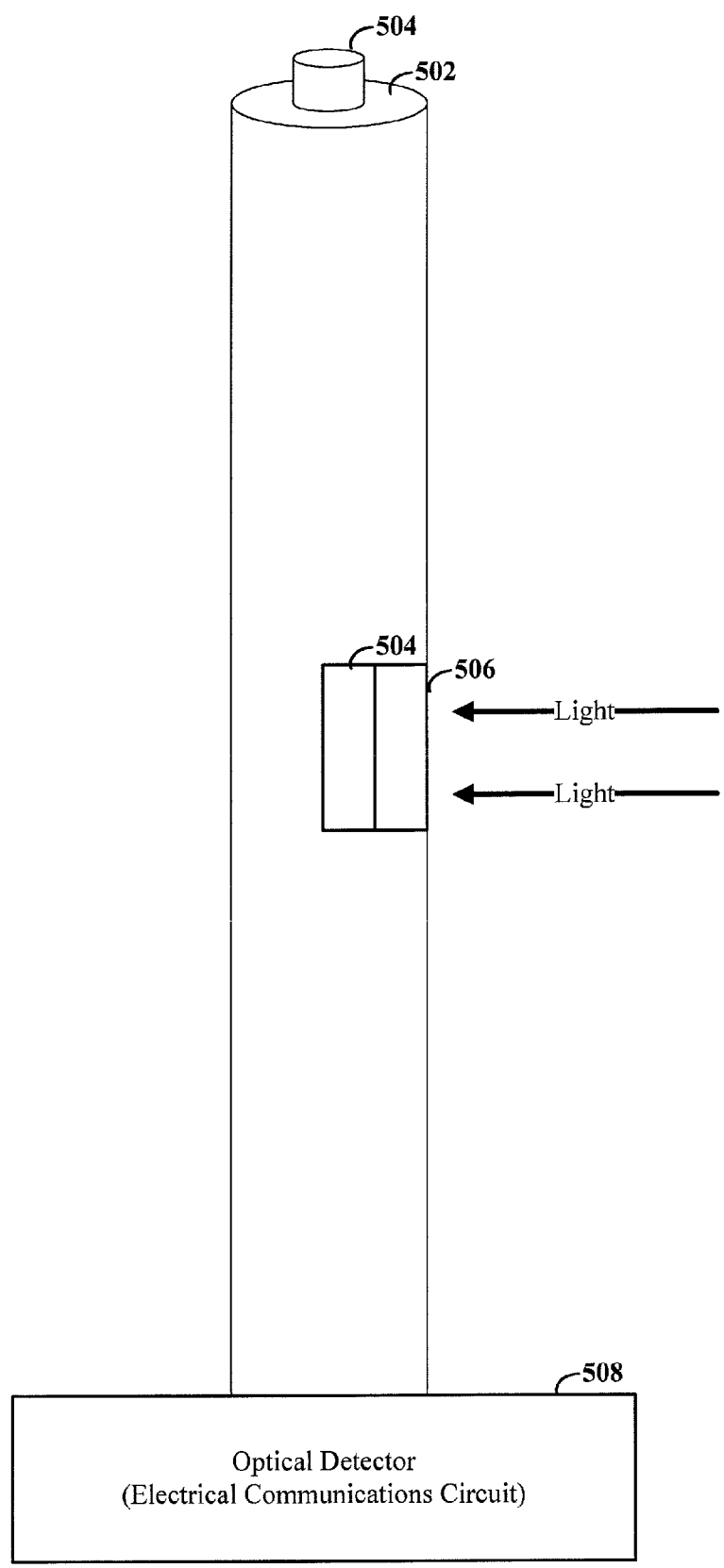
FIG. 5 depicts a wire having an optically exposed portion, consistent with embodiments of the present disclosure.

FIG. 5 depicts a wire having an optically exposed portion, consistent with embodiments of the present disclosure. As discussed herein, wire 502 can include an optically transitive portion 504. The wire 502 can have an intermediate portion 506 altered to expose the optically transitive portion 504. An optical detector 508 can be used to detect the presence of light at the exposed portion. An optical detector 508 can also be configured to use the electronic properties of wire 502 (e.g., for communications and/or power).

The ability to sense light can be of use for a variety of applications including, but not limited to, breach of a sealed area, detection of lighting conditions in remote locations, detection of daylight, or automatically enabling (safety) lights in the absence of light. For instance, a system in an aircraft can use such a configuration to provide dual functionality to backup/redundant lighting systems. The wires can provide power and control to emergency lighting, while at the same time automatically detect the loss of light in the airplane. In certain embodiments, the location of the intermediate exposed portion 506 for various wires can be located proximate to various lights that should be continuously lit. In the event that all (or most) of the lights fail, this failure can be detected by the emergency system, which can be configured to be isolated/separated from the primary lighting system. The light passed into the exposed areas is converted by an optical converter (e.g., commercially available from Texas Instruments) to a voltage signal for electrical conductance by the wire.

Figure 6:
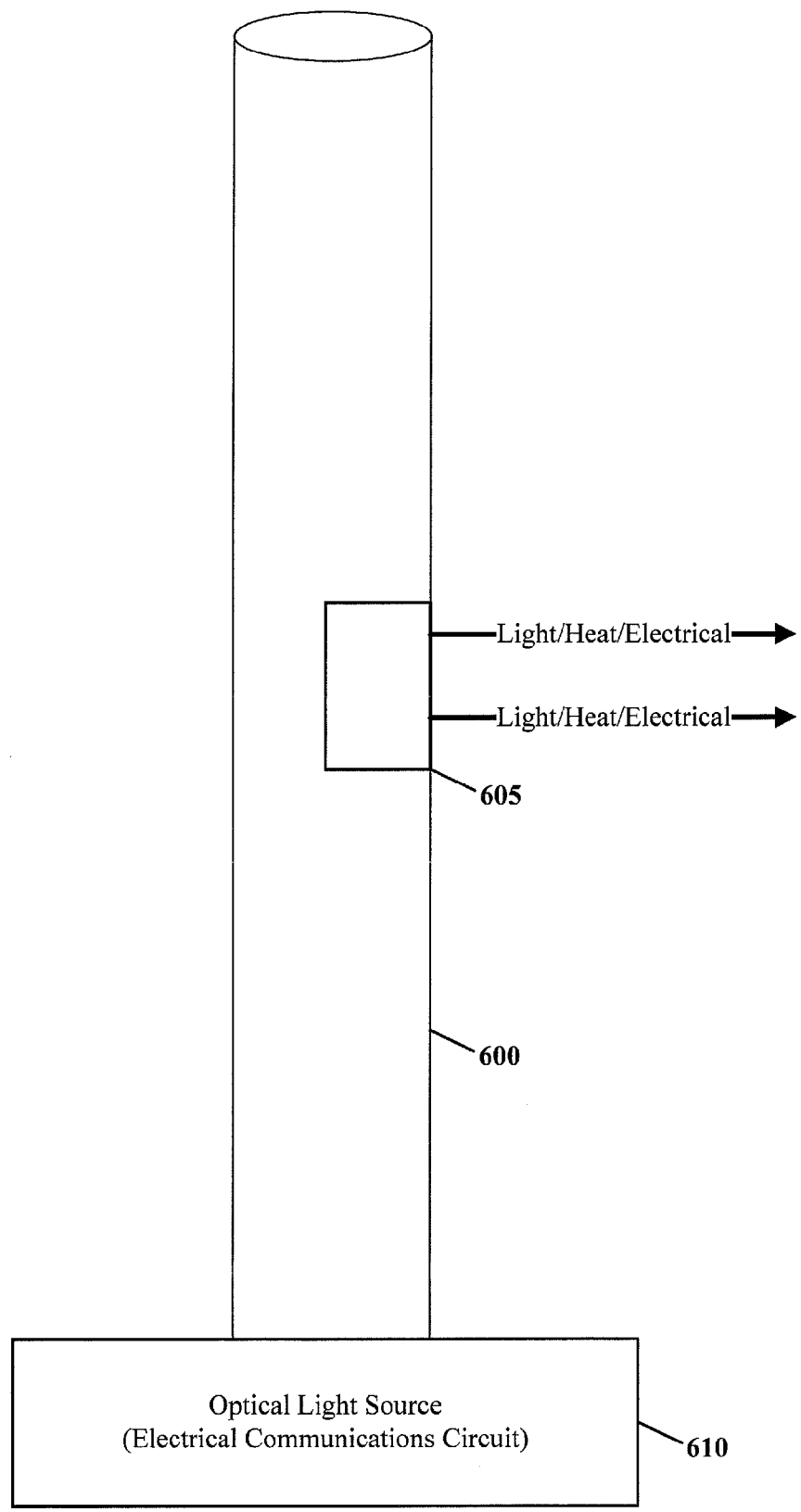
FIG. 6 also depicts a wire having an optically exposed portion, consistent with embodiments of the present disclosure.

FIG. 6 also depicts a wire 600 having an optically exposed portion 605, consistent with embodiments of the present disclosure. FIG. 6 shows that the optically exposed portion 605 can also (or alternatively) be used to deliver light. The light delivered by one or more such wires 600 can be used for a variety of purposes and functions. In certain instances, the light can be used to trigger a remote optical sensor 610. This may be particularly useful where the optical sensor 610 is not directly coupled to the wire(s). In other instances, the light may be used to trigger a chemical reaction. Numerous other possibilities are also contemplated.

Figure 7:
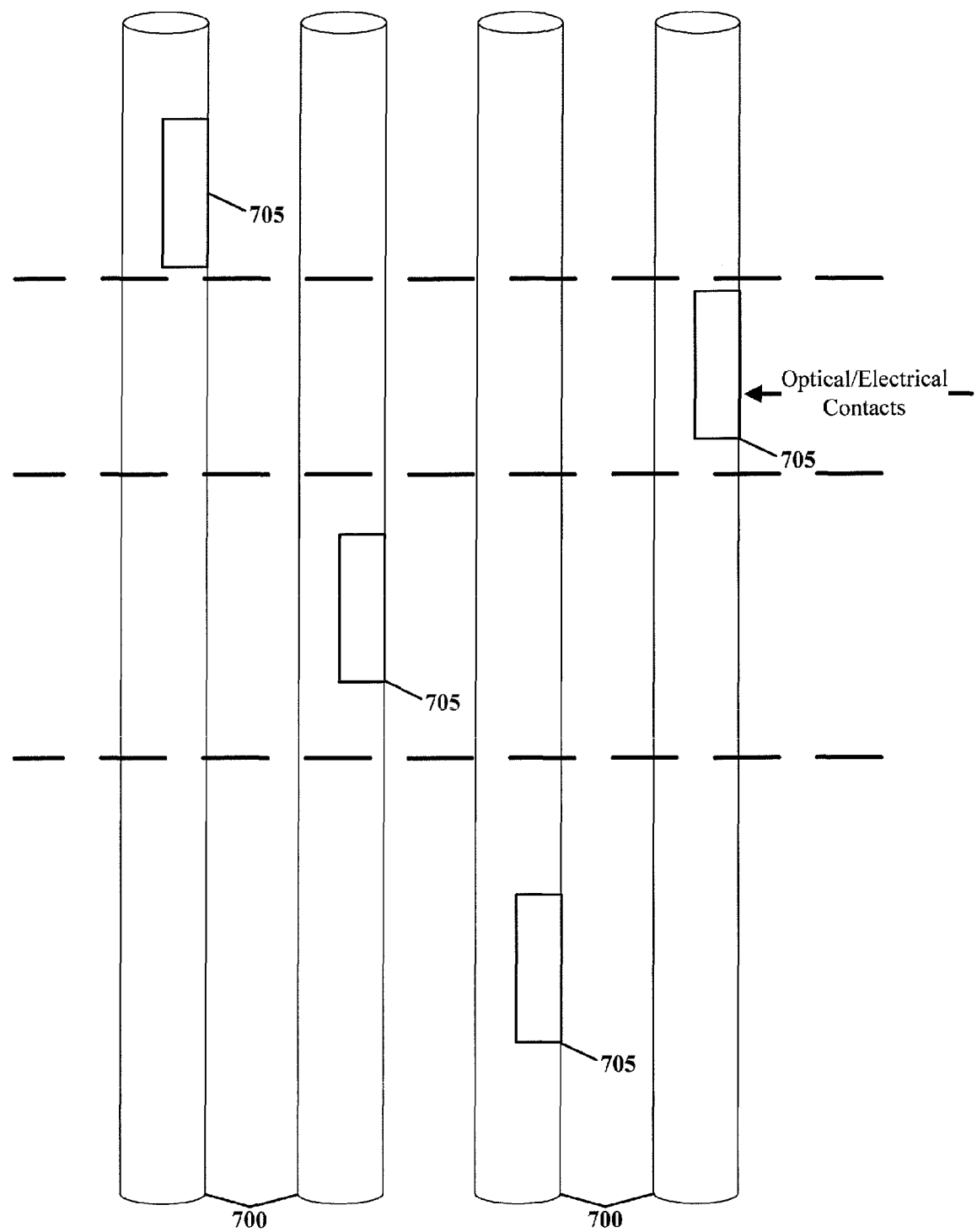
FIG. 7 also shows an exposed portion that provides an electrically exposed portion, consistent with embodiments of the present disclosure.

FIG. 7 also shows that multiple wires 700 having exposed portions 705 can provide an electrically exposed portion. In certain instances, the electrically exposed portion 705 can be connected to an electrical device for intermediate communication therewith (and/or providing power). In other instances, the electrically exposed portion 705 can be used to detect conductive changes in material in contact with the exposed portion. For instance, exposure to water or other conductive material could cause the impedance to change by shorting the wire 700. This can be particularly useful for detecting unwanted moisture (or fuel leakage) in a vehicle or structure. In another instance, the wire 700 could be located within a liquid that may undergo chemical changes that can be detected by the exposed wire.

A run of wires 700, as shown in FIG. 7, may pass through multiple compartments of a vehicle, building or device. Each compartment can be indexed/correlated to one or more wires 700 having a corresponding exposed portion 705. Detected light from a particular wire can then be used to determine the compartment from which the lighting originated. For instance, if a normally sealed compartment is breached, the wiring can be used to automatically detect the breach as well as determine the precise location thereof. Light can also be provided to specific compartments. This can be useful for conveying information to sensor equipment in the compartments without having to terminate the wire in the compartment. Thus, a single wire can run between two points to provide electrical communication (and/or power) therebetween, while also providing optical communication at an intermediate point. In certain embodiments, the exposed portion of the wire can be coated with a material that provides optical transmittance and electrical insulation.

Figure 8:
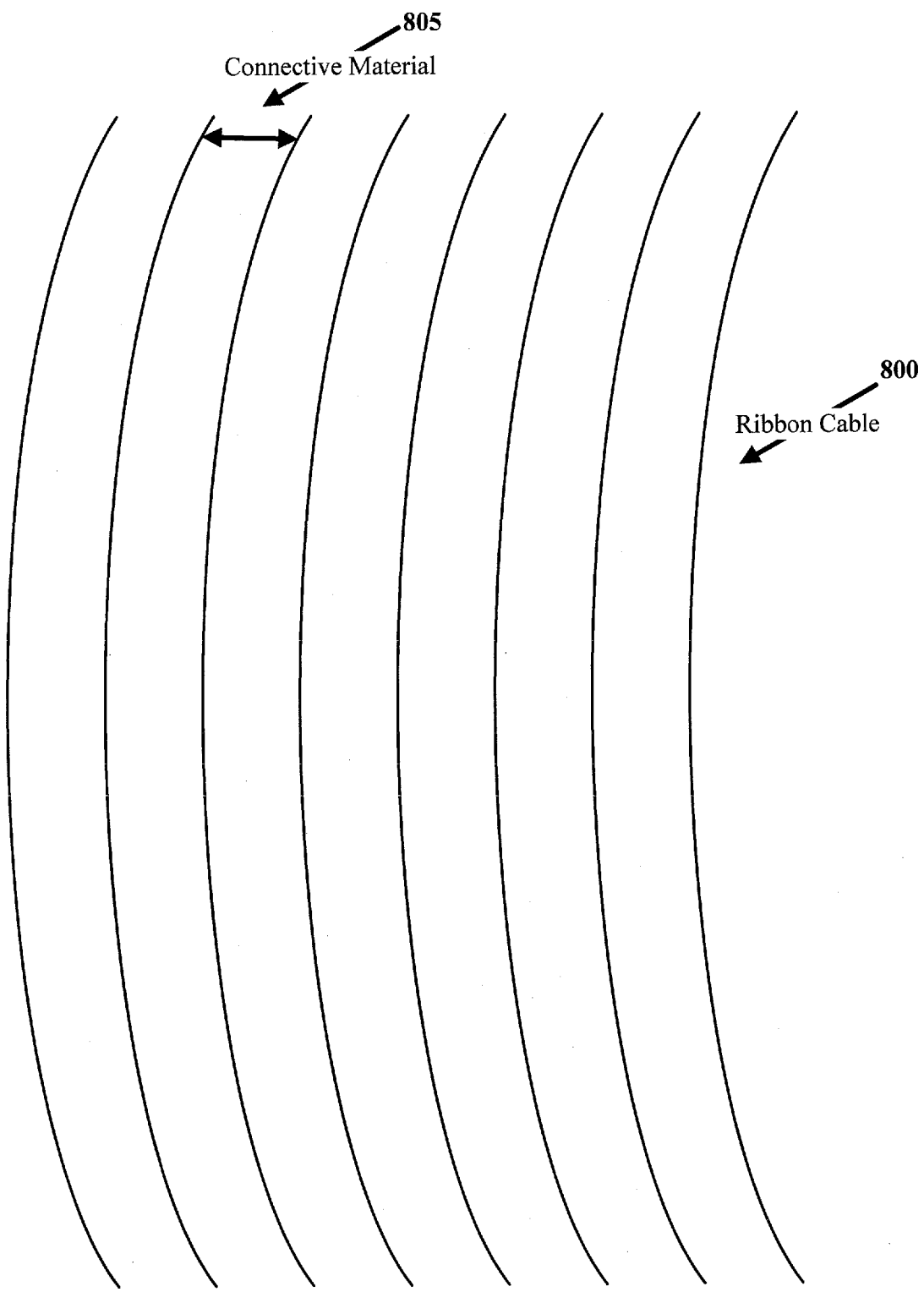
FIG. 8 depicts a ribbon cabling option, consistent with embodiments of the present disclosure.

FIG. 8 depicts a ribbon cabling option, consistent with embodiments of the present disclosure. The individual wires 800 can be bound together in a largely two-dimensional manner as depicted, with connective material 805 separating the individual wires 800. The connective material 805 can be any one of various insulators including, but not limited to, different types of plastics. In one instance, an end of the ribbon cable can be directly connected to a physical connector. In another instance, one or more of the individual wires 800 can branch off (e.g., to disparate remote connection points). Such cabling can be particularly useful for bundling of the cables in a manner that is optimized for particular stresses. For instance, ribbon cable can be used within (and to connect between two different) electronic devices such as computers and handheld devices.

Figure 9:
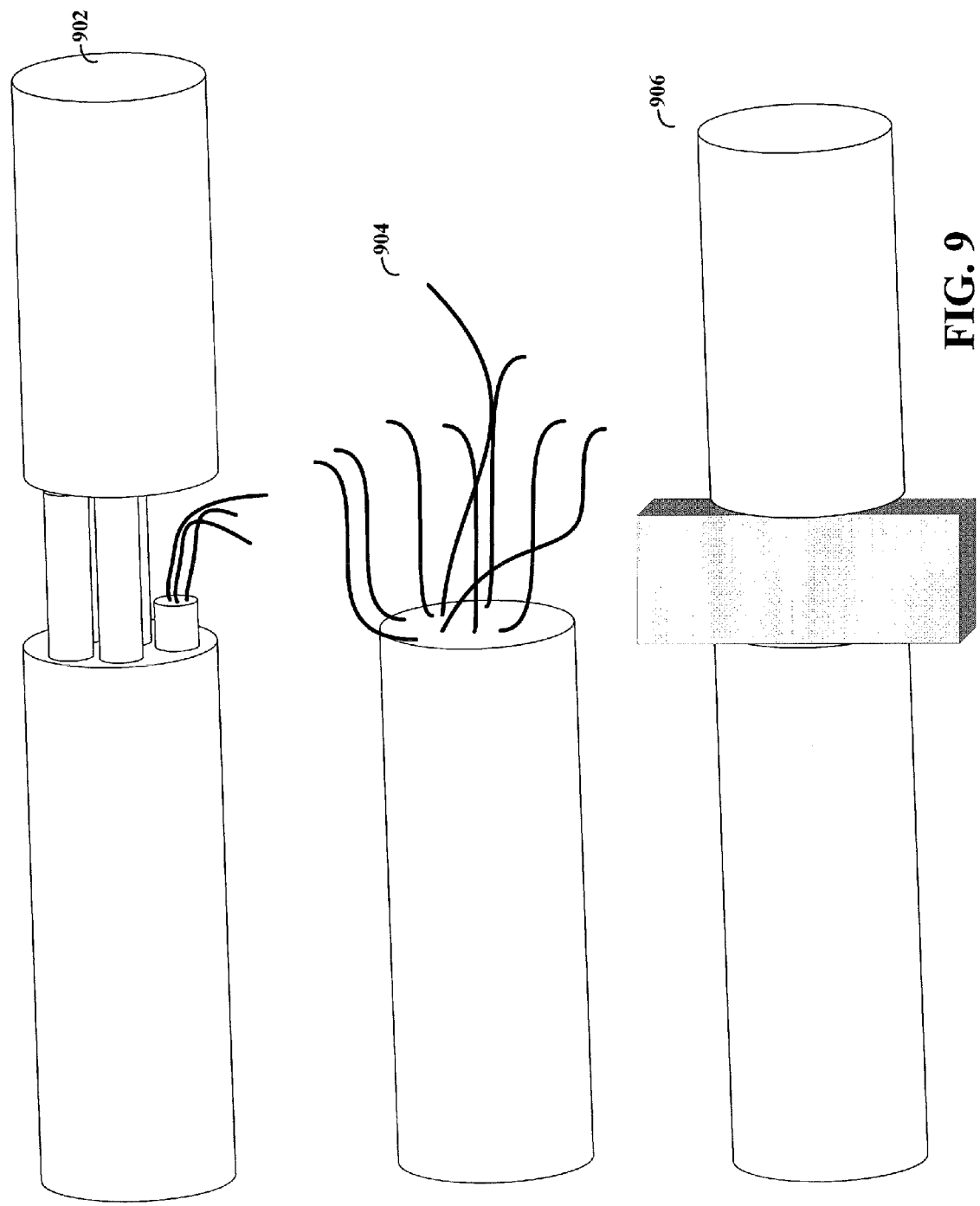
FIG. 9 depicts cabling for various bundling of wires, consistent with embodiments of the present disclosure.

FIG. 9 depicts cabling for various bundling of wires, consistent with embodiments of the present disclosure. Bundling option 902 shows a larger cable containing multiple smaller cables. Each smaller cable can include multiple individual wires. At various points, larger cable is configured to allow for one or more of the smaller bundles to leave the larger bundle in order to route the corresponding individual wires to a different physical location, relative to the larger bundle. This can be particularly useful for long runs of cabling with multiple drop-off points, such as in an aircraft or a naval vessel. The light weight and durability of the wires can be well suited for harsh environmental conditions associated with such applications.

Bundling option 904 shows a single cable with multiple individual wires and without smaller bundles being contained therein. At various points, one or more of the wires can leave the larger bundle and then the corresponding individual wires can be routed to a different physical location (relative to the main cable). Alternatively, all wires can terminate/leave the bundle at the same point.

Bundling option 906 shows a connector between two runs of cabling. The connector can serve a number of purposes. A first possible purpose is a physical anchor point for the individual wires and the associated runs of cabling. Another purpose includes breaking the run of cabling into distinct segments, which can facilitate replacement of faulty wiring by allowing a shorter segment to be replaced (as opposed to replacing a longer run of cabling as would be used without the connector separating the run into two segments). Yet another possible purpose is to allow an access/drop-off point to route signals or power to or from the cable. External devices can be linked to the wires through the connector. Alternatively, or in addition, the connector can provide a branching option in which additional cable run(s) can be added (e.g., a single cable can branch into multiple cables at the connector). The connector can also serve to amplify transmitted signals on the wires to allow for longer runs of cabling, whether the signals are electrical or optical. A further possible purpose is to provide intelligent connection, control and/or switching of signals between the wires. The connector can include intelligent routing between individual wires. This can be particularly useful for avoiding the need to track which wire is connected to which input or output, and coordinate the connections on each end. Rather, the wires can be arbitrarily connected to the connector, which communicates with remote devices on each end of the runs of wire to determine how to route signals from a wire on the first run to a corresponding wire on the second run. Moreover, this can allow for dynamic adjustment, such as compensating for failure events (e.g., failure of remote devices or failure of individual wires) by rerouting data between the runs of cable. In some instances, the runs of cable include one or more redundant/backup wires, allowing for signals carried on failed wires to be rerouted to the redundant wires.

Figure 10:
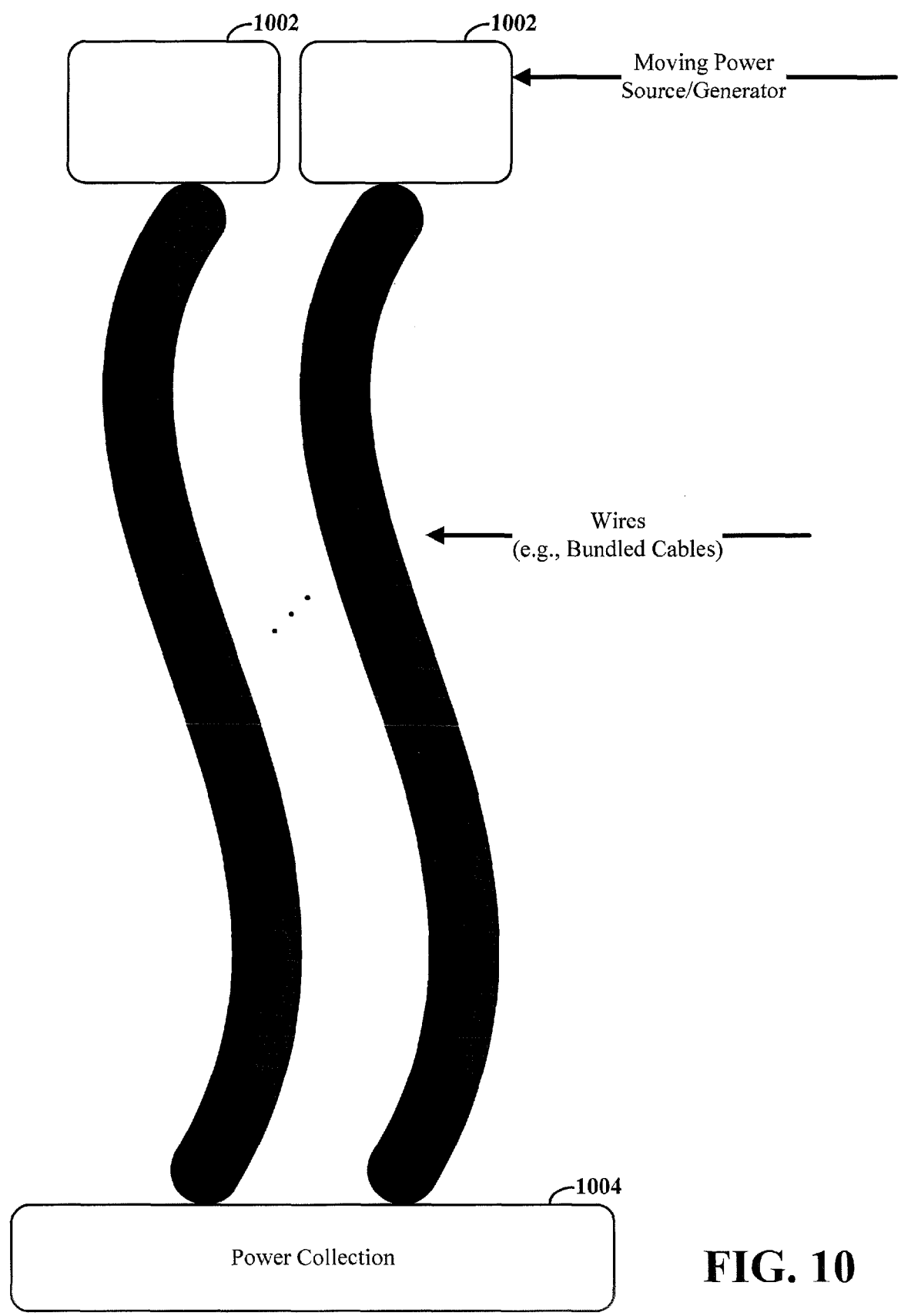
FIG. 10 depicts a system for power generation and delivery, consistent with embodiments of the present disclosure.

FIG. 10 depicts a system for power generation and delivery, consistent with embodiments of the present disclosure. Using one or more of the wire delivery solutions discussed herein, power can be provided from mobile generator stations 1002 to a power collection point 1004. Non-limiting examples of mobile generator stations 1002 include (ocean) wave-powered generators, high-altitude generators and offshore/floating wind-powered stations. These and other mobile stations can benefit from durable, flexible and light weight electrical power delivery solutions. For instance, high-altitude generators can operate similar to a kite or glider that is tethered to the ground via a power delivery cable. This tether is subject to significant movements and strain and the weight thereof can adversely affect the ability of the generator to stay aloft. Similarly, water-based solutions can be subject to repetitive motion and associated strains. In some instances, the power generators might be adversely affected by motion dampening that might be caused by a connection to heavy cabling.

Figure 11:
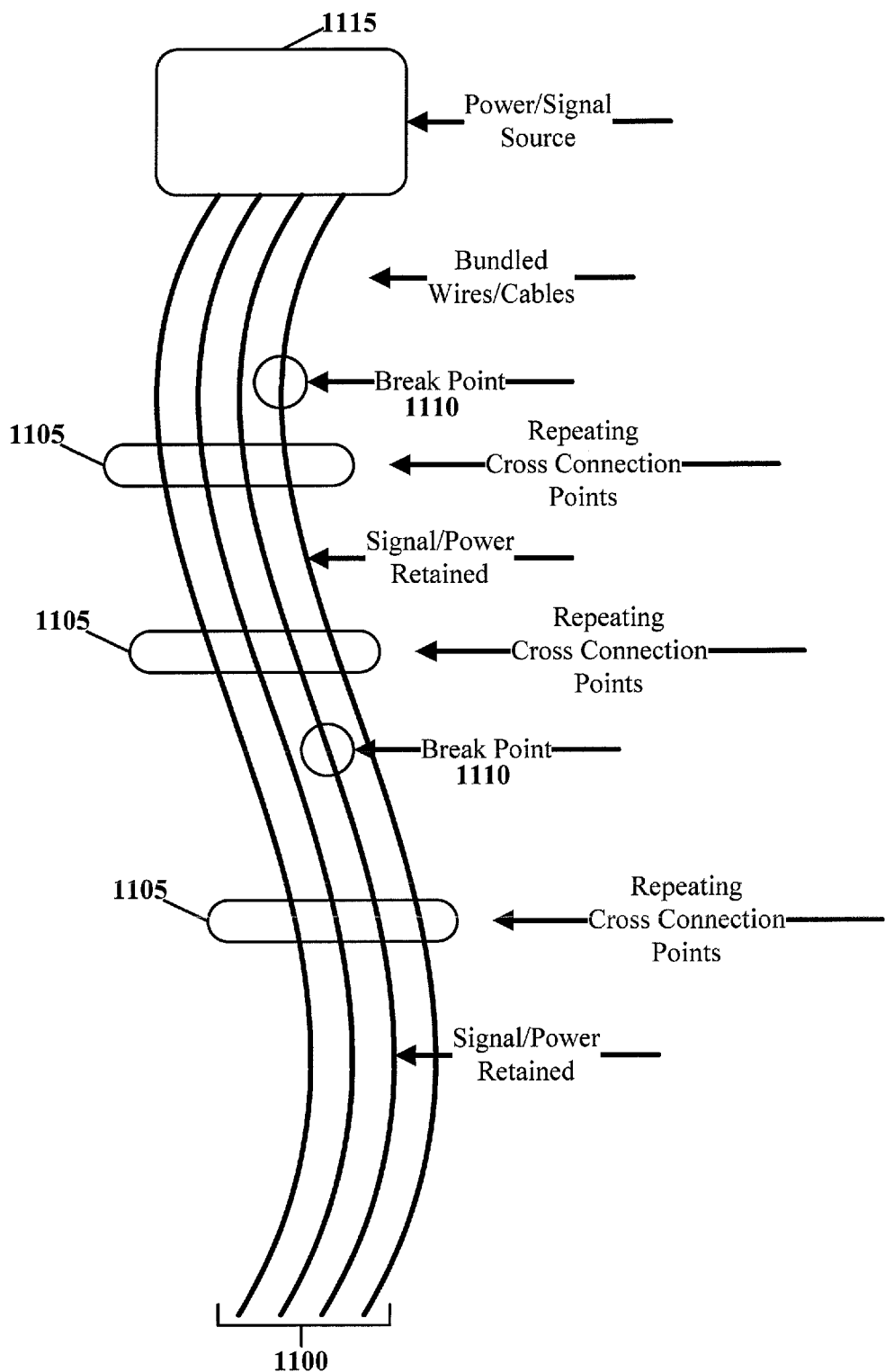
FIG. 11 depicts a multiple wire solution with built in redundancy, consistent with embodiments of the present disclosure.

FIG. 11 depicts a multiple wire solution with built-in redundancy, consistent with embodiments of the present disclosure. Various systems subject wiring to significant stresses and harsh environmental conditions while also requiring high reliability. For instance, many vehicles (whether aeronautical, naval, ground-based or otherwise) subject wiring to repetitive vibration, and/or adverse temperatures. Moreover, weight can be a significant factor in design and function thereof.

Various embodiments provide cross-connection points 1105 between multiple wires 1100 or cables of wires. For instance, electrical power (or data communications) can be sent along each wire. At the cross-connection point, the wires 1100 can be electrically (re)connected. If one wire fails before the cross-connection point 1105, it will cease to provide electrical power. This will effectively reduce the power-providing capabilities of the system and increase the effective resistance of the wires 1100 by removing one parallel path. However, at a connection point 1105, that is after the failed/break point, all wires are reconnected, effectively allowing the failed wire to once again provide power. This reconnection can be particularly useful for mitigating the effect of multiple wire failures. For instance, FIG. 11 depicts four wires, with two failed wires (break points) 1110; however, at the cross-connection 1105, there are at least three wires available to provide power (from the power source 1115) at every point along the run.

Figure 12:
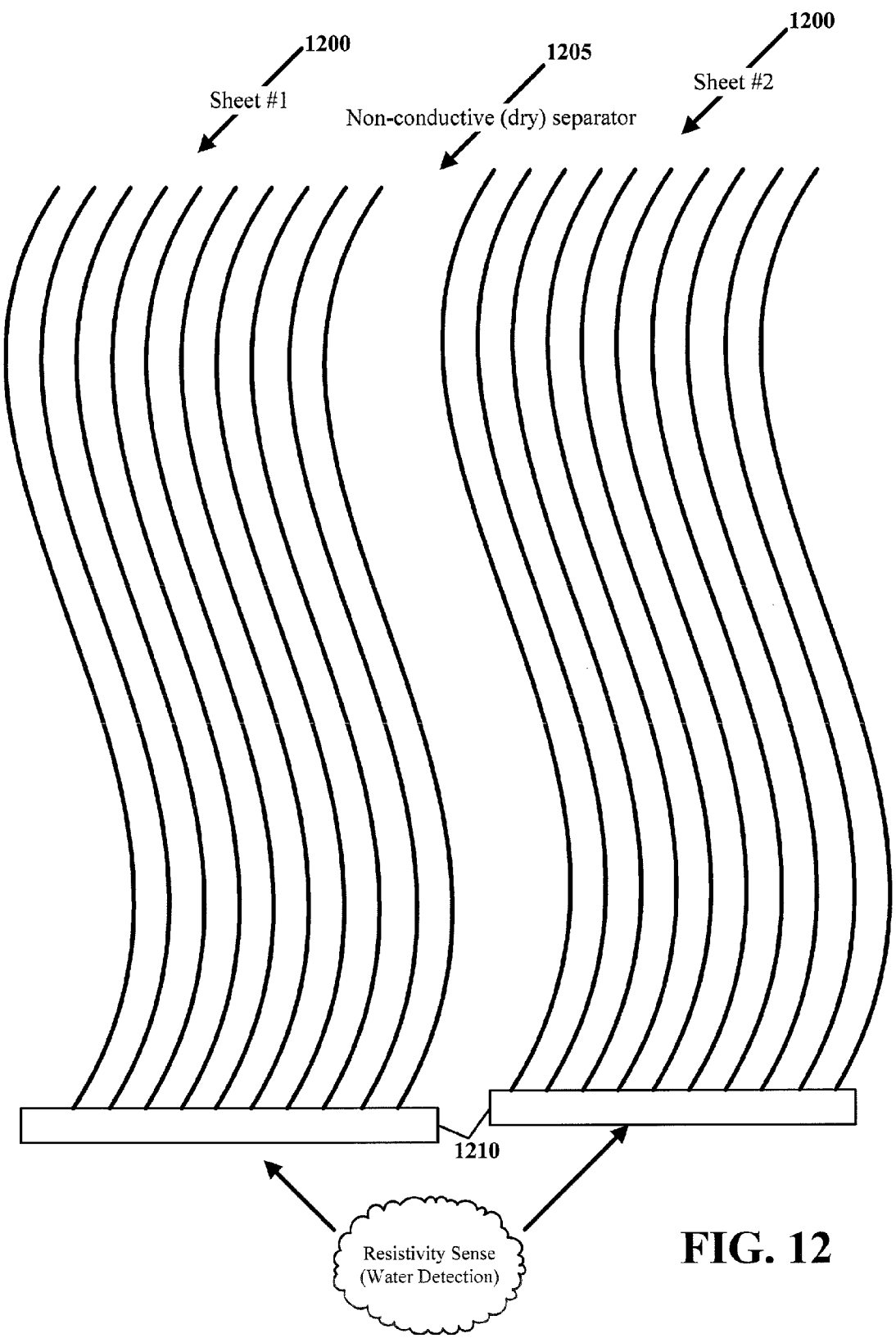
FIG. 12 depicts a set of one or more wires separated by a material, consistent with embodiments of the present disclosure.

FIG. 12 depicts a set of one or more wires 1200 separated by a material 1205, consistent with embodiments of the present disclosure. In certain structures and applications it can be beneficial to detect moisture and other contaminants. This includes, but is not limited to, vehicles and buildings. Electrical wiring is already desirable for many such applications. Accordingly, embodiments of the present disclosure make use of the flexible and durable wire to detect moisture or other contaminants. In certain embodiments, one or more wires 1200 of a run of wires (whether configured in a sheet, cable or individually routed) has the electrical conductive portion exposed along the run. Two sets of such exposed wire(s) can be separated by a material 1205 that is an insulator or nominally-conductive. The separating material 1205, however, is selected such that its conductivity changes when it is exposed to moisture or other contaminants. A device 1210 monitors the conductivity between the separated wires and thereby detects moisture when the conductivity changes.

In certain embodiments, the wires 1200 can be arranged on opposite sides of a sheet of the separating material 1205 and then placed within the walls of the structure. This can be particularly useful for detecting small moisture leaks within locations that are difficult to otherwise monitor. The wiring can also be used for other purposes, including providing power and data communications.

Figure 13:
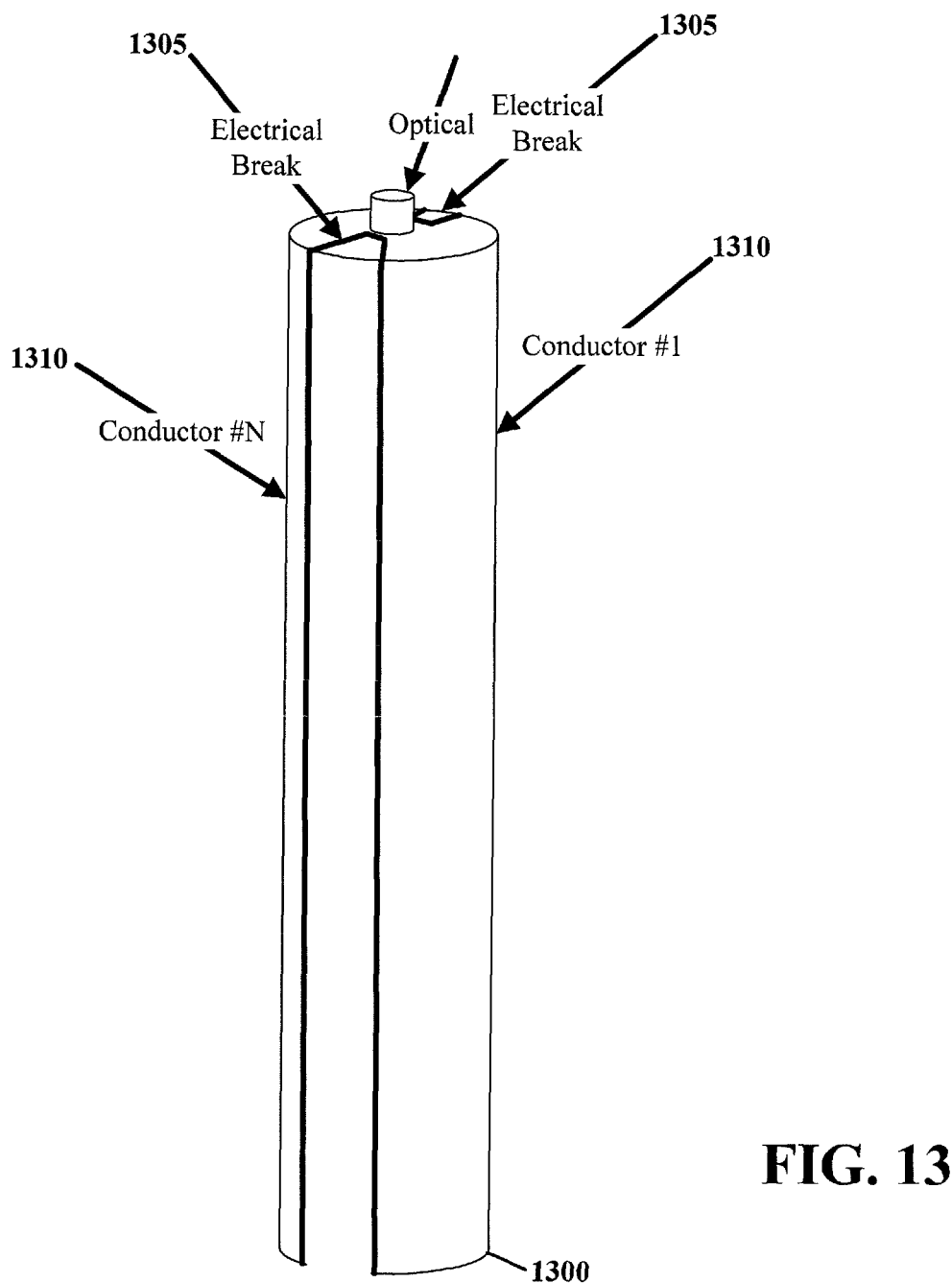
FIG. 13 depicts a wire having multiple conductive paths, consistent with embodiments of the present disclosure.

FIG. 13 depicts a wire 1300 having multiple conductive paths, consistent with embodiments of the present disclosure. The wire 1300 includes multiple breaks 1305 that allow the conductive portions of the wire 1300 to be segmented into individually addressable conductors 1310. Thus, different signals or voltages (e.g., for power) can be provided on the same wire 1300 but on different conductors 1310. The breaks 1305 can be created using several possible manufacturing steps, a few non-limiting examples are described herein.

In a first example, masking material can be applied to the wire 1300 before conductive material is applied. The conductive material is then applied. In one instance, the strips are then physically removed to create the breaks 1305. In another instance, the material of the strips are resistant to metal deposition and therefore metal does not form on the material during the deposition process.

In another example, the metal deposition process is with only a portion of the wire 1300 exposed to the source of the metal deposition. The portion can include different sides of the wire 1300, each separated by a physical gap. Thereafter, insulating material can be deposited over and between the deposited metal portions.

Figure 14:
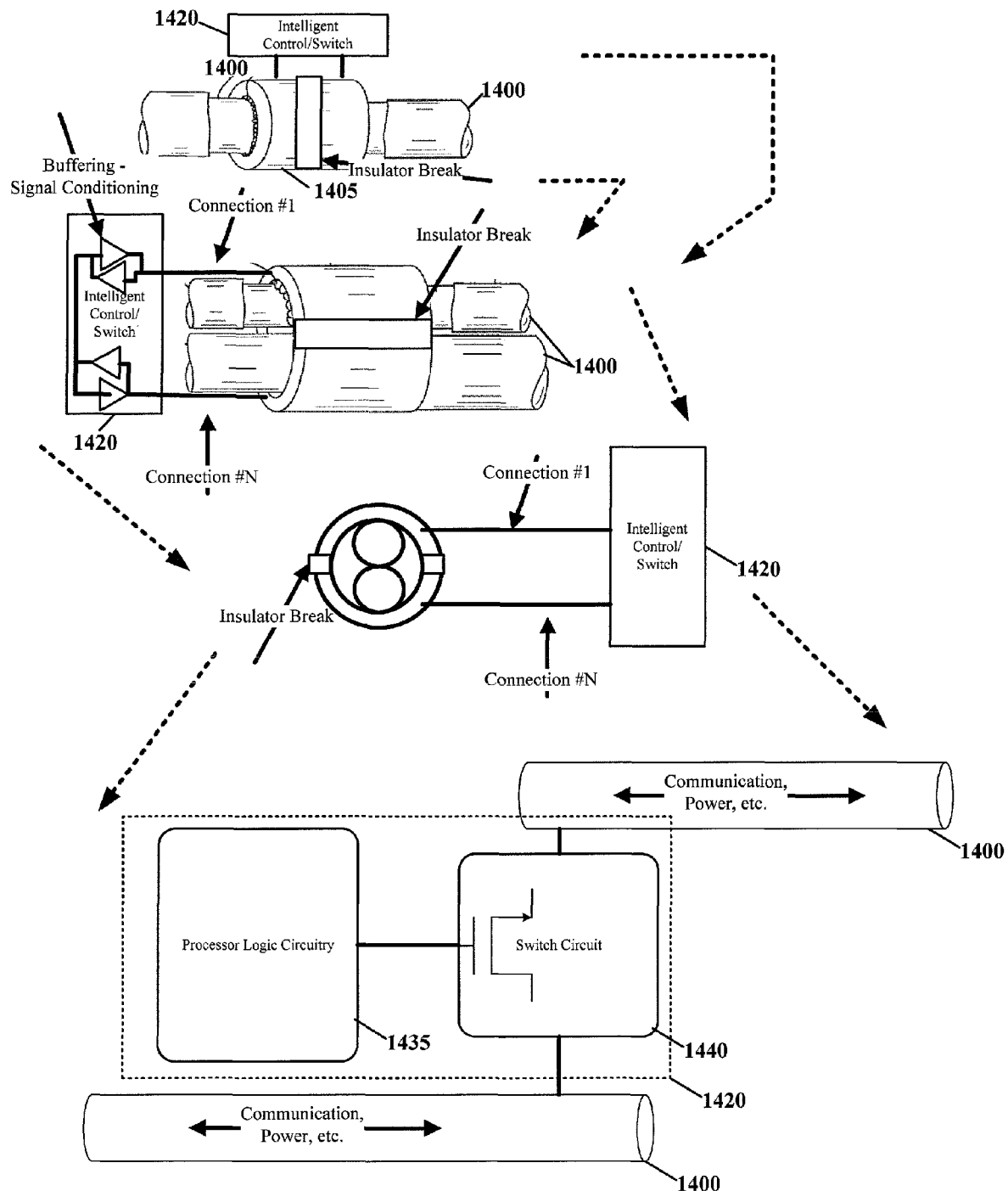
FIG. 14 depicts connection solutions for intersecting wires, consistent with embodiments of the present disclosure.

FIG. 14 depicts connection solutions for intersecting wires 1400, consistent with embodiments of the present disclosure. An intersection point of wires or connector can be linked using an electrical connector 1405 that contacts each of the wires 1400. In some instances, a direct electrical connection between the wires 1400 can be provided by the connector 1400. In other instances, an intelligent connection circuit 1420 can provide additional functionality. The intelligent connection circuit 1420 can provide a number of different functions.

For instance, a first function can include signal reproduction, filtering and/or amplification (e.g. using processor logic circuitry 1435). This can be particularly useful for maintaining signal integrity over long distances. The intelligent connector 1420 can provide signal conditioning in a unidirectional or bidirectional manner depending upon the application.

In another instance, the intelligent connection circuit 1420 can provide a controllable connection between the wires. For instance, the intelligent connection circuit 1420 can function as a (transistor-based) switch 1440 that connects or disconnects the wires 1400 from one another.

In still other instances, the intelligent connection circuit 1420 can transmit and/or receive data to remote devices using either (or both) wires 1400. The intelligent connection circuit 1420 can be connected to a local device (e.g., a sensor) and transmit information to and from the local device. In a particular implementation, multiple intelligent connection circuits can be used to daisy-chain multiple different sensors using a common run of wiring. For instance, an aircraft may have sensors, or other devices that are located throughout the cabin. Using an intelligent connection circuit 1420, sensors can be linked using a common run of wire. In certain instances, the intelligent connection circuit 1420 uses a communication protocol designed to accommodate possible communication conflicts. For instance, a time-division multiplexed scheme can be used so that the devices are assigned different time slots for communication. In another instance, collision avoidance and/or collision detection and handling protocols are used.

Figure 15:
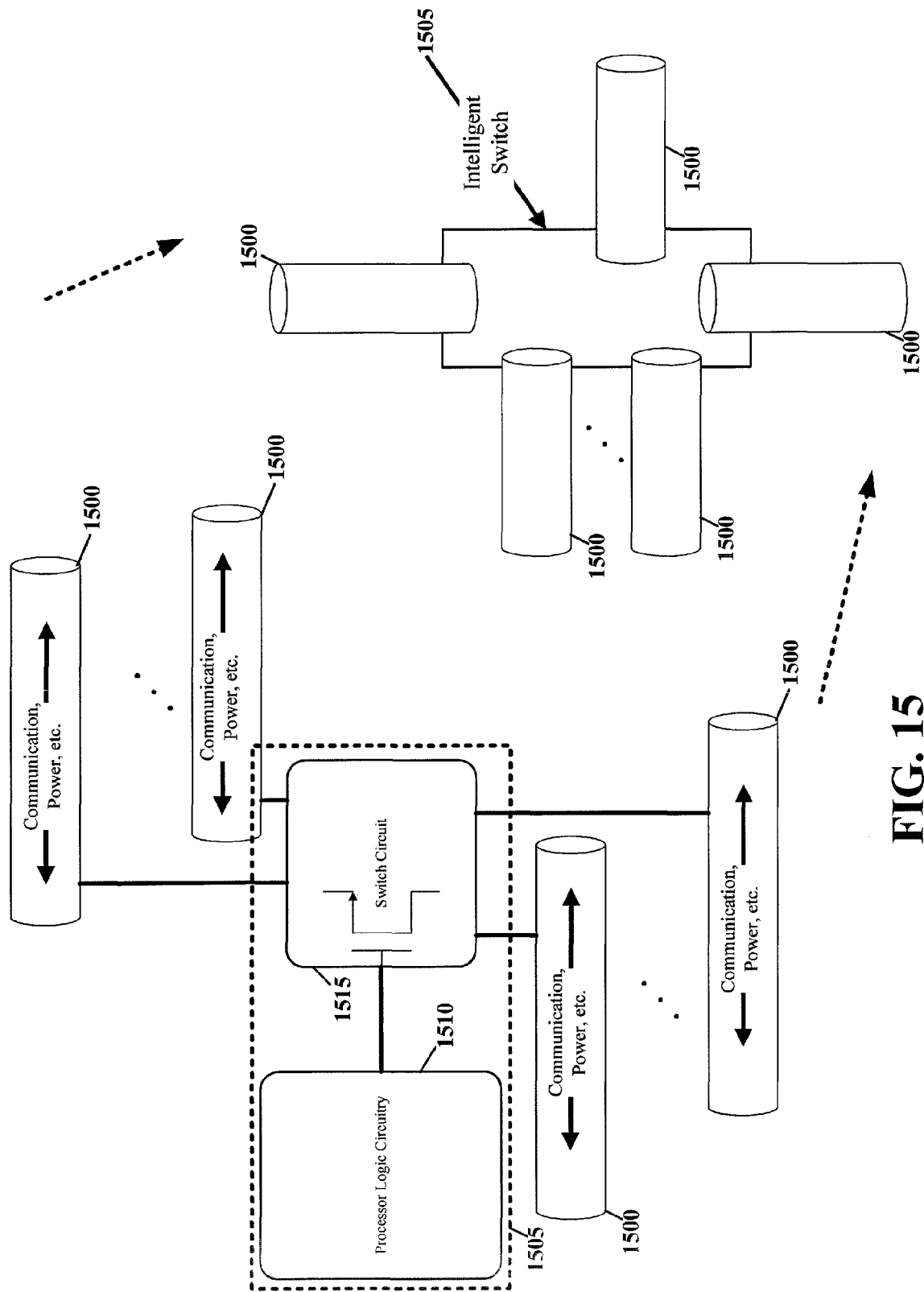
FIG. 15 depicts connection solutions for intersecting wires, consistent with embodiments of the present disclosure.

FIG. 15 depicts connection solutions for intersecting wires 1500, consistent with embodiments of the present disclosure. As shown in FIG. 15, an intelligent connection circuit 1505 can provide an interface for many different wires. In certain embodiments the intelligent connection circuit 1505 can selectively connect one wire to any of several different possible wires 1500. This can be useful for providing routing flexibility, as well as for dynamic rerouting to provide redundancy (e.g., for communications or power for vital systems in an aircraft). Examples of intelligent/(electrically or optically) controllable switching circuitry 1510 can be found in a variety of previously documented and commercially available resources, including for example, programmable logic arrays 1515, microcontrollers and single and multi-chip IC packages (e.g., as sold by Xilinx, Microchip, Intel, Texas Instruments and Analog Devices). For an example of another type of switching circuitry, reference may be made to U.S. Pat. No. 6,636,014 (Payne), U.S. Pat. No. 7,683,585 (Johnson) and U.S. Pat. No. 5,726,553 (Waugh), each of which is fully incorporated herein by reference for all that they contain.

The various embodiments discussed herein can be used in combination with one or more other embodiments. Moreover, various embodiments relate to systems that include transceiver circuits designed for use with the wires discussed herein. Certain embodiments include transceivers that use both the electrical and optical properties of the wire for communication, power and/or delivery of stimulus. For instance, electrical properties can be used as a primary communication method, with optical communications as a redundant backup option (or vice versa). In the event that an electrical fault is detected (e.g., a short circuit condition) optical communication can be used until the electrical fault has been corrected.

In other embodiments, the electrical and optical communicative properties can be used in combination. This can be particularly useful for increasing communication bandwidth and also for providing increased communication integrity and/or security. For instance, an optical signal can be sent that includes error correction code for data communicated on the electrical conductor.

Figure 16:
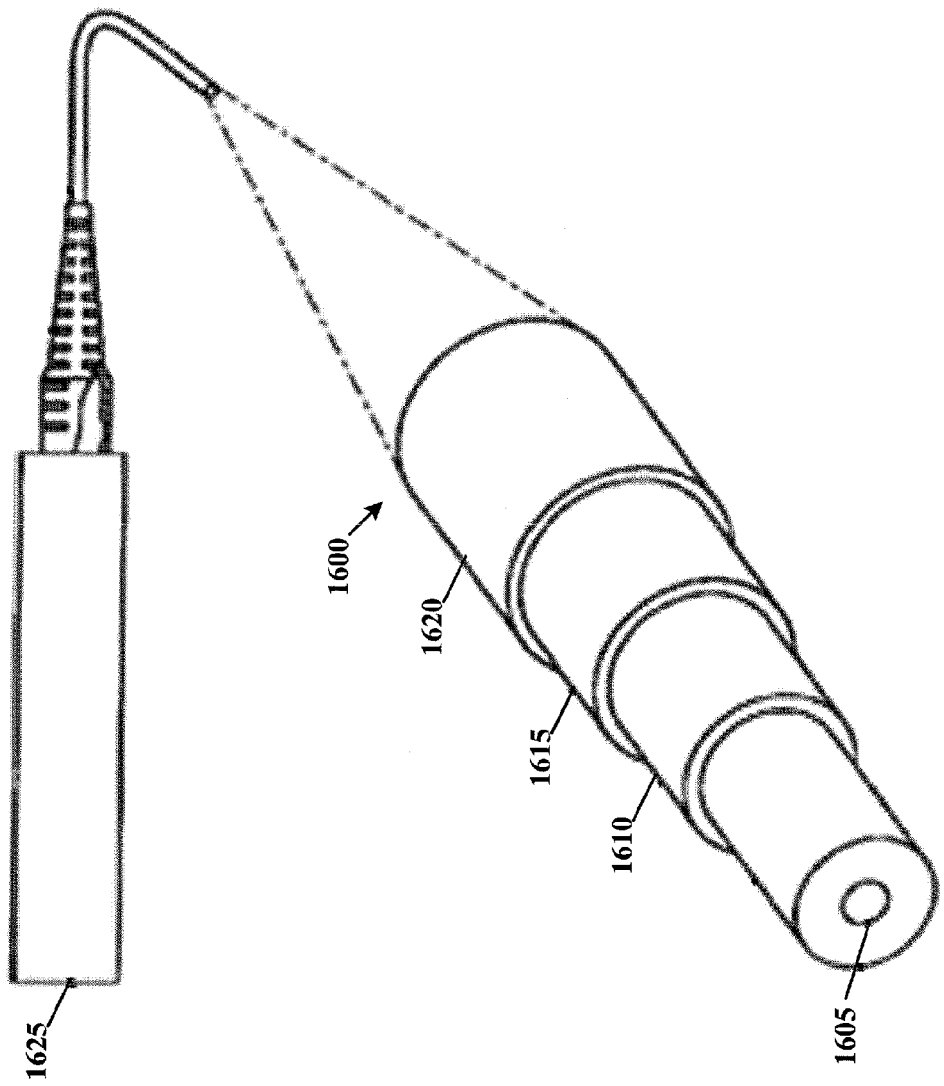
FIG. 16 shows an optical fiber cable with a glass or plastic optical fiber that carries light along its length and various layers of protective and strengthening materials surrounding the optical fiber, consistent with various aspects of the present disclosure.

FIG. 16 shows an optical fiber cable 1600 with a glass or plastic optical fiber 1605 that carries light along its length and various layers of protective and strengthening materials 1610/1615 surrounding the optical fiber, consistent with various aspects of the present disclosure. This cable 1600 is useful in connection with, for example, data transfer (one-way or two-way); data transfer and providing power to a source; integration of multiple fibers into a mesh; sensing; and various uses thereof. In certain embodiments of this type, the illustrated arrangement addresses environmental and usage concerns including optical fiber 1605 reliability problems such as damage to the buffer layer 1610 and/or cladding layer 1615, such as micro-cracks, that can grow with time when the optical fiber 1600 is exposed, particularly in hostile environment conditions, and such as reduced light transmission which can impede the necessary critical usages. The layers include hot melt thermal plastic material 1620 comprising ethylene vinyl acetate (EVA) to facilitate self-healing of such damage in the optical fiber cable 1600. Specific applications include without limitation, space, and marine environments to minimize outgassing and the ability to work with radiation resistant fibers/shielding while adding little if any size/weight.

Implementation of the optical fiber cable 1600 (see, also FIG. 1), with or without the module 1625 can be to provide data transfer. Data can be transferred either one-way or two-ways. In an embodiment directed towards one-way data transfer, data can be transferred from a module 1625, or like device, and to a source; or from the source to the module 1625. In two-way data communication, data transfer can occur both from the module 1625 to the source, and from the source to the module 1625. Two-way data transfer allows, for example, feedback between two apparatuses, and/or simultaneous exchange of data. The two-way data transfer can be accomplished by utilizing multiple bundling of cables 1600 (see FIG. 9 and discussion thereof), or layering of the cables 1600 (i.e., cables wrapped around a subsequent cable). Additionally, the optical fiber cable 1600 can be used to transfer data (one-way or two-way transfer) and provide power to a source (e.g., through use of multiple bundles of cables or layers of cables). Further, the optical fiber cables can be woven into a mesh-like structure, which can be random or organized, in order to provide multiple signals and multiple single paths. In this manner, a large number of signals can be exchanged while maintaining numerous pathways for which those signals can be exchanged (avoiding interrupt if one of the signals is cut). See, e.g., FIGS. 2-4 (and discussions thereof). Moreover, the optical fiber cables can be strung together utilizing smart interconnects. See, e.g., FIG. 14. In this manner, multiple fiber cables can be connected together, and the smart interconnects can be utilized to determine, for example, if there is a break in the chain. This discussion can be applicable to all cable-based embodiments discussed herein. For further discussion regarding optical fiber cables, further reference can be made to FIGS. 1-13. In this type of embodiment, the module is also exemplified by way of the basic diagram discussed in connection with FIGS. 1-2 of U.S. Pat. No. 8,050,527, (Noddings) which is incorporated by references for this teaching.

Figure 17:
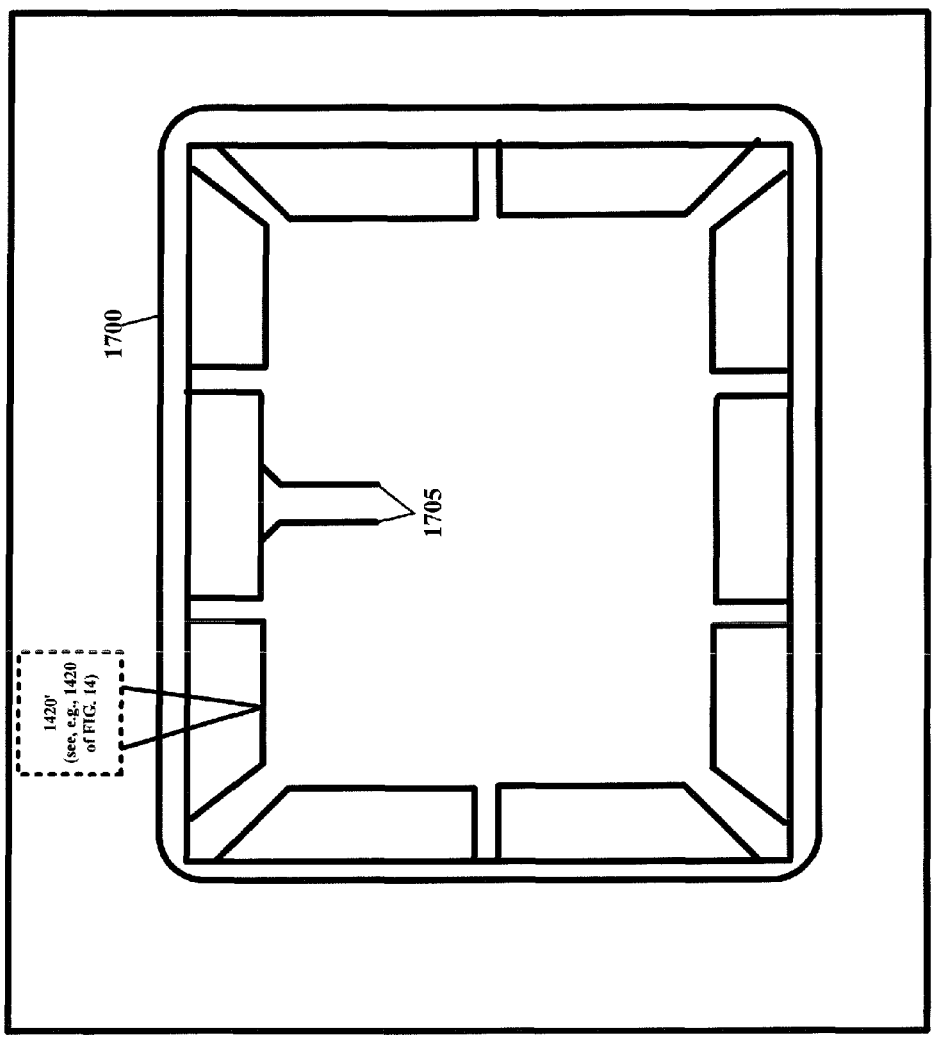
FIG. 17 shows a cable-based sensing system that carries signals from the lengths or sensor nodes which are located in and nearby seat cushions, consistent with various aspects of the present disclosure.

FIG. 17 shows a cable-based sensing system that carries signals from the lengths or sensor nodes which are located in and nearby seat cushions 1700, consistent with various aspects of the present disclosure. The layers include different conductors for different mediums of communications such as optical fiber cable 1705 for high-speed data such as video and, via conductive paths in the same cable 1705, concurrent communication of other data such as seat-related sensing (e.g., seat belt status, seatbacks upright, tampered-with seat cushions, passengers seated during turbulence conditions) and such as other endpoint nodes for light-indicating status to the passengers, flight attendant needs and sensing Wi-Fi applications being on. Specific applications include without limitation, aircraft, space, and marine environments to minimize the amount of cabling needed to provide multiple communication bussing. This approach also offsets need for visual inspections of the seat before, during and after takeoff.

Implementation of the cable-based sensing system (see, also FIG. 1) can be used to provide data transfer along multiple rows of seats, and along airplane aisles, to a single control center (e.g., CPU) that can process and display the data (e.g., seat belt status, seatbacks upright, tampered-with seat cushions, passengers seated during turbulence conditions). Data from the seats can be transferred one-way by providing an indication to the control center of what is sensed. Data can also be transferred two-ways by providing an indication of what is sensed, and providing a feedback indication to the passenger that, for example, their seatback is not upright. One way and two-way data transfer (and power transfer) is discussed in further detail above with reference to "A," and in further detail in additionally attached figures (see, e.g., FIG. 9). Further, the optical fiber cables can be woven into a mesh-like structure, which can be random or organized, in order to provide multiple signals and multiple single paths, and placed in the seat cushion. In this manner, a large number of signals can be exchanged while maintaining numerous pathways for which those signals can be exchanged (avoiding interrupt if one of the signals is cut). See, e.g., FIGS. 2-4 (and discussions thereof). Additionally, the meshes can be layered to create, for example, a pressure sensor for indicating whether a passenger is in their seat (see FIG. 7). Moreover, the optical fiber cables can be strung together utilizing smart interconnects 1420'. See, e.g., FIG. 14. In this manner, multiple fiber cables can be connected together, and the smart interconnects can be utilized to determine, for example, if there is a break in the chain. In this type of embodiment, the seat cushion arranged is also exemplified by way of the basic diagram discussed in connection with FIG. 11 of U.S. Pat. No. 8,094,041 (Wentland et al.) which is incorporated by references for this teaching.

Figure 18:
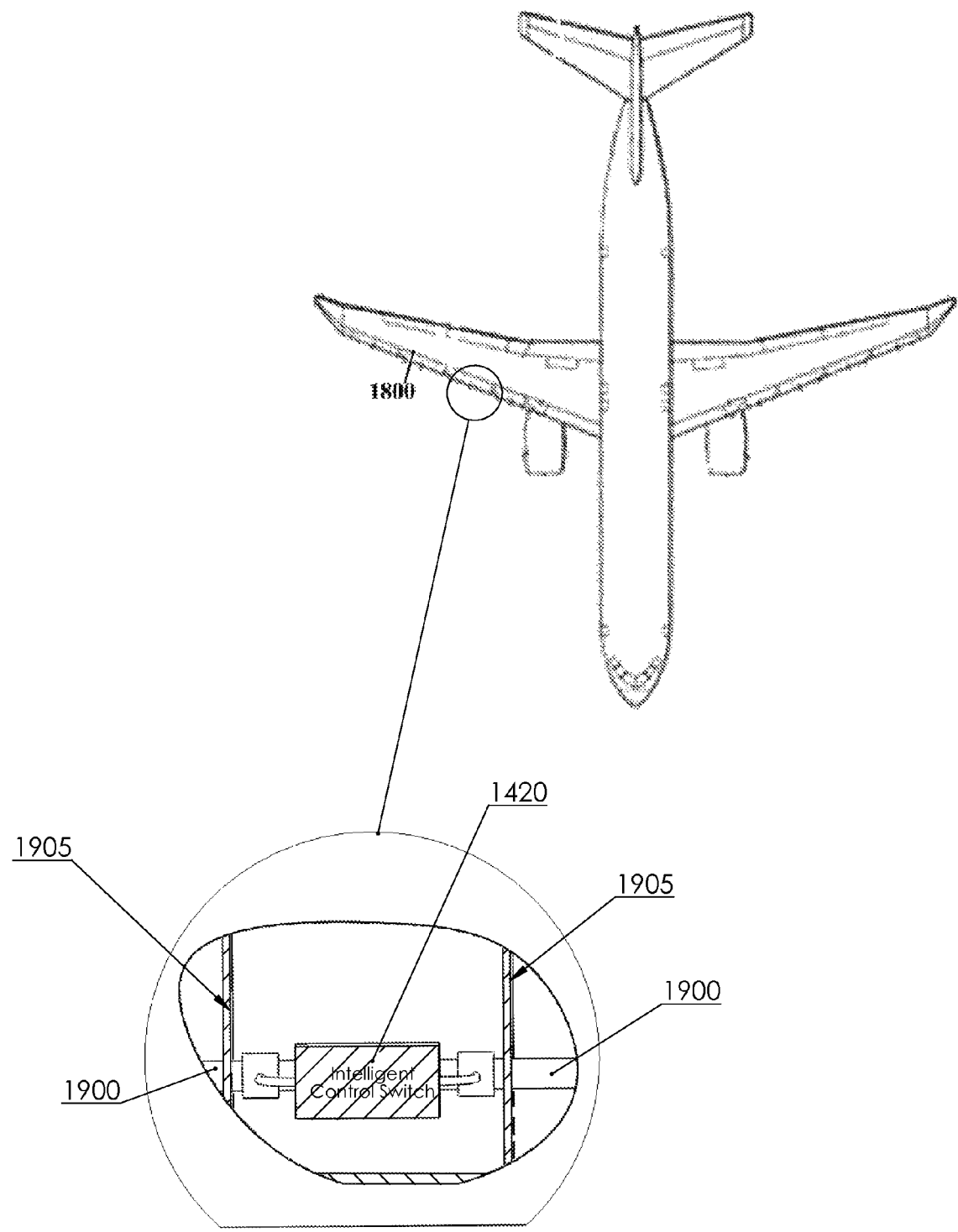
FIG. 18 shows a cable-based sensing system for monitoring flight control surfaces on an aircraft, consistent with various aspects of the present disclosure.

FIG. 18 shows a cable-based sensing system for monitoring flight control surfaces (e.g., ailerons, elevators, rudders, spoilers, flaps, slats, airbrakes, and/or other suitable control surfaces) on an airplane that are used to maneuver and control the altitude of an aircraft, consistent with various aspects of the present disclosure. The cable-based sensing system includes cable(s) 1800 that run along the edge of the wings to the slats locating on the leading edges of wings. This cable 1800 (or array of cables) is useful in connection with monitoring situations that result (e.g., jams, disconnects) that may cause the slats to fail to move or operate in a manner that is normal or operable. The layers include different conductors for different mediums of communications such as measuring different skews or changes along the wings and corresponding to the slats, which can alter the control surfaces and different portions of the airplane via conductive paths in the same cable, and can include concurrent communication of other data relating to the control surfaces. The multiple layers allow for less sensors, less wiring while increasing the number of control surfaces that can be monitored, and the number of different misalignments, disconnects and jams (for example) that can be monitored. Specific applications include without limitation, aircraft, space, and marine environments to minimize the amount of cabling needed to provide multiple communication bussing. This approach also offsets need for multiple sensors and multiple wires for monitoring the multiple sensors.

The cable-based sensing system can also be used for determining atmospheric condition changes on critical flight surfaces (e.g., wings, stabilizers, rudders, ailerons, propulsion system components, fuselage of the aircraft), consistent with various aspects of the present disclosure. The atmospheric conditions that contribute to changes on critical flight surfaces include but are not limited to humidity, temperature, and the presence of biological or chemical agents on the surfaces of the flight surfaces. The cable-based sensing system includes cable(s) that run along surfaces of the aircraft, and to the critical areas relating to propulsions systems. The layers include different conductors for different mediums of communications such as measuring the many different surfaces and areas of interest on the aircraft, as well as the many atmospheric conditions that may be of interest. Specific applications include without limitation, aircraft, space, and marine environments to allow for monitoring of atmospheric conditions the entire length of the cable-based sensor system rather than only at the sensor's location. This approach also offsets need for multiple sensors and multiple wires for monitoring the multiple sensors.

Implementation of the cable(s) can include one-way or two-way data transfer. In an embodiment directed towards one-way data transfer, data can be transferred from a sensor to a control system. In two-way data communication, data transfer can be from the sensor to the control system, and, for example, in response thereto, the control system can provide a signal to adjust the flight control surfaces. Further, the optical fiber cables 1800 can be woven into a mesh-like structure, which can be random or organized, in order to provide multiple signals and multiple single paths. In this manner, a large number of signals can be exchanged while maintaining numerous pathways for which those signals can be exchanged (avoiding interrupt if one of the signals is cut). See, e.g., FIGS. 2-4 (and discussions thereof). Moreover, the optical fiber cables 1900 can be strung together utilizing smart interconnects 1420'. See, e.g., FIG. 14. In this manner, multiple fiber cables 1800 can be connected together, and the smart interconnects can be utilized to determine, for example, if there is a break in the chain. In this type of embodiment, cable-based sensing systems for detecting such above-discussed events is also exemplified by way of the basic diagrams discussed in connection with FIGS. 4 and 7, respectively of U.S. Pat. No. 8,115,649 (Moy et al.) and U.S. Pat. No. 8,115,646 (Tanielian et al.) which are incorporated by references for this teaching.

Figure 19:
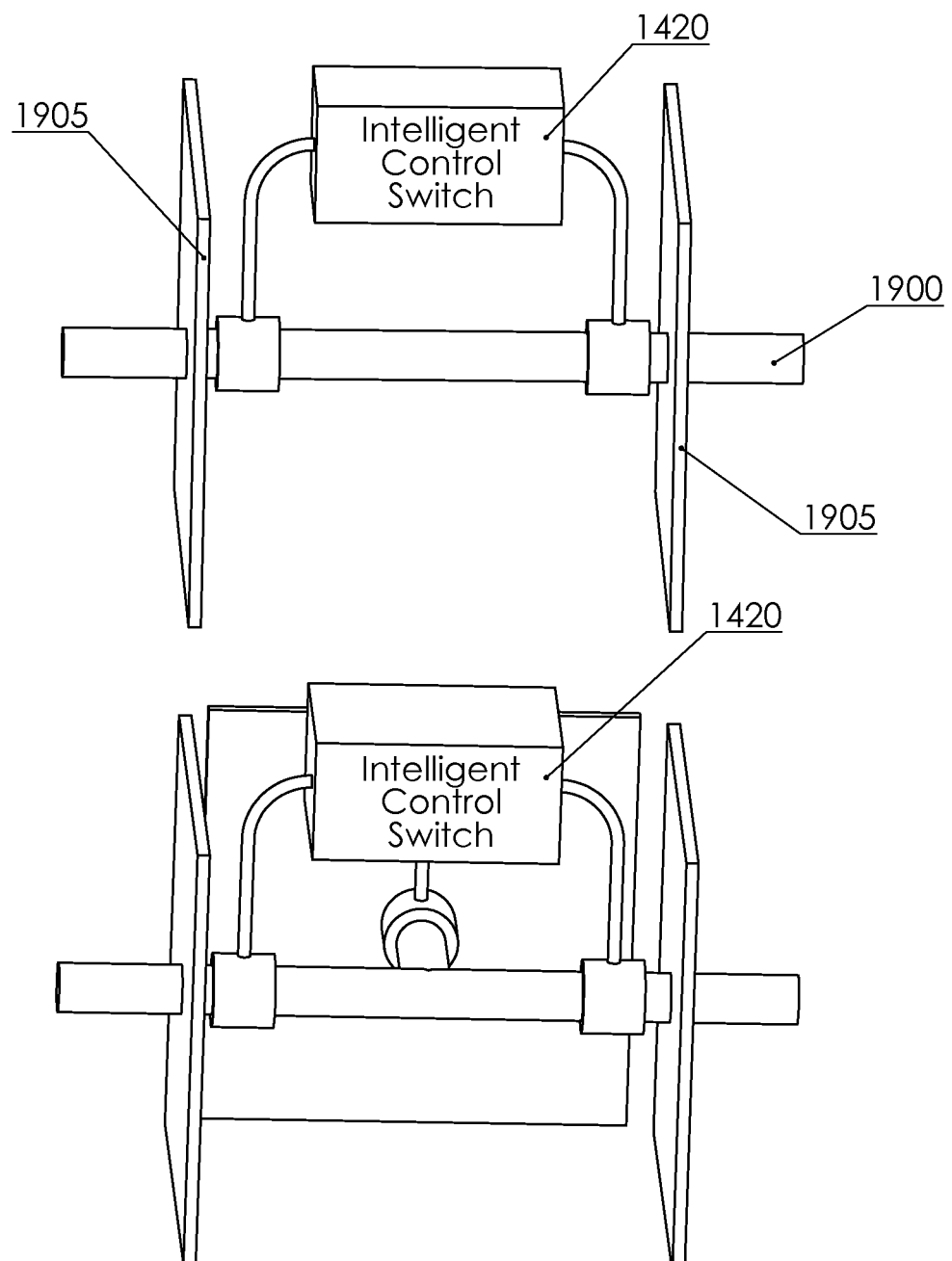
FIG. 19 shows an optical fiber cable with a glass or plastic optical fiber that carries light and/or electrical signals along a path, consistent with various aspects of the present disclosure.

FIG. 19 shows an optical fiber cable with a glass or plastic optical fiber 1900 that carries light and/or electrical signals along a path, which includes various protective and strengthening materials surrounding the optical fiber 1900, consistent with various aspects of the present disclosure. This cable 1900 is useful in connection with spanning a discontinuity in an optical channel. The cable 1900 in the instant embodiment eliminates the need for multiple wire bundles that are bulky and large (requiring extra space). Additionally, in small/tight spaces, the optical fiber 1900 allows for difficult connections due to the flexibility of the cable 1900. Further, the layers include hot melt thermal plastic material comprising EVA to facilitate self-healing of such damage in the optical fiber cable 1900, so that the cable 1900 does not have to be replaced when it is damaged. In certain embodiments of this type, the illustrated arrangement serves to address environmental and usage concerns including optical fiber reliability problems, such as damage to cable 1900 (i.e., the buffer layer and/or cladding layer), such as micro-cracks, that can grow with time when the optical fiber is exposed particularly in hostile environment conditions, and such as reduced light transmission and/or electrical signal transmission which can impede the necessary critical usages. Specific applications include without limitation, space, and marine operations/environments to provide continuation of a fiber optic channel through structures such as bulkheads 1905, and may not facilitate repair of fiber when original fiber may be damaged such as, by way of example and not by way of limitation, from chafing, from repair efforts or from inadvertent damage during maintenance or operation.

Implementation of the cable 1900 can include one-way transfer. Moreover, the optical fiber cables 1900 can be strung together utilizing smart interconnects 1420'. See, e.g., FIG. 14. In this manner, multiple fiber cables can be connected together, and the smart interconnects can be utilized to determine, for example, if there is a break in the chain. In this type of embodiment, the fiber optic channel provided through structures such as bulkheads is also exemplified by way of the basic diagram discussed in connection with FIGS. 3-5 of U.S. Pat. No. 8,023,794, (Morris et al.) which is incorporated by references for this teaching.

Figure 20:
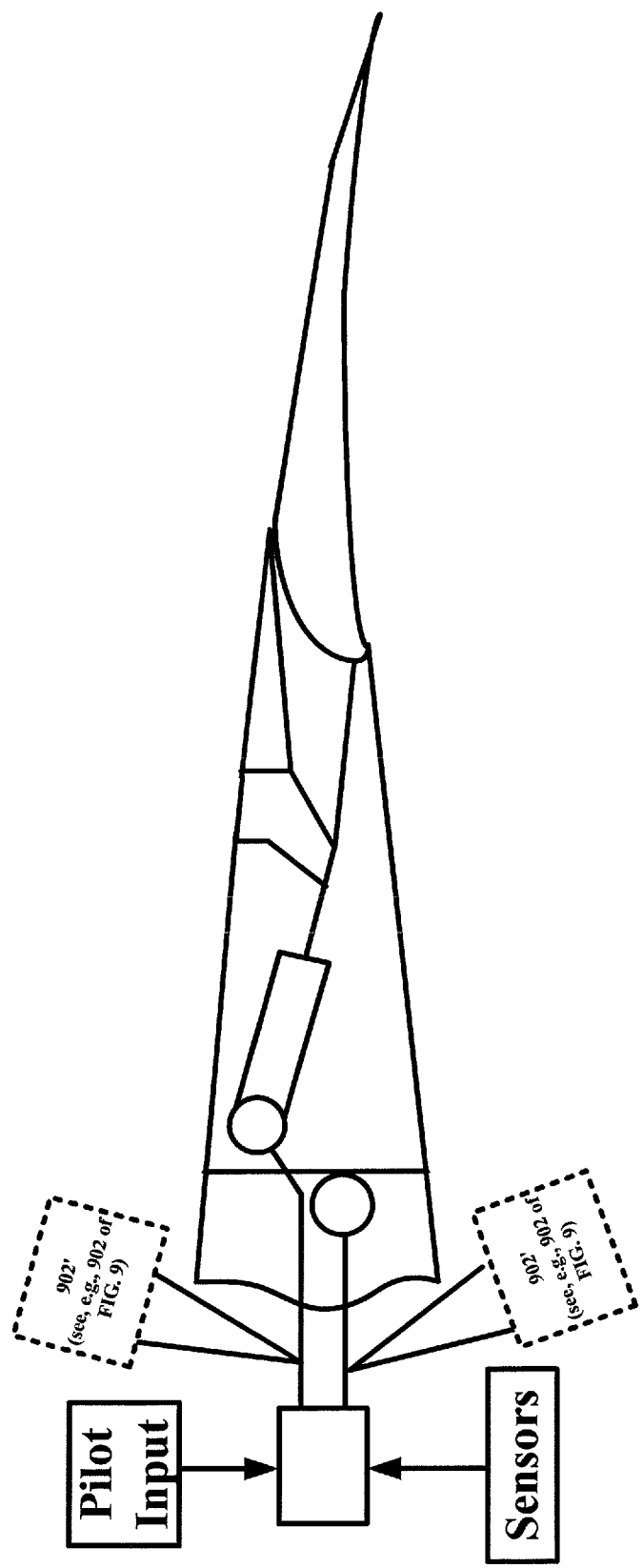
FIG. 20 shows a cable-based sensing/control system for aircraft flaps and spoilers and receiving feedback from the aircraft flaps and spoilers during operation, consistent with various aspects of the present disclosure.

FIG. 20 shows a cable-based sensing/control system for aircraft flaps and spoilers and receiving feedback from the aircraft flaps and spoilers during operation, consistent with various aspects of the present disclosure. The cable-based system can itself operate as a sensor placed along critical surfaces of flaps and spoilers (which control aircraft lift and drag) and collect data relating to, for example, drag on the flaps and spoilers; flap and spoiler position; and flap and spoiler skew. This information can be utilized by pilots of the aircrafts to adjust and control the flaps and spoilers along the same cable. In this manner, the same cable can sense critical information regarding the flaps and spoilers, provide the information to the pilot, and control the adjustment of the flaps and spoilers. The single cable can include multiple layers of different conductors (for different mediums of communications and different data transfers) or multiple internal cords that can transfer multiple data streams simultaneously. This approach also offsets need for multiple sensors and multiple wires for monitoring/controlling the flaps and spoilers.

Data can be transferred either one-way or two-ways. In an embodiment directed towards one-way data transfer, data can be transferred from a control, or like device, and to a source (flaps or spoilers); or from the source to the module. In two-way data communication, data transfer can occur both from the control to the source, and from the source to the control. Two-way data transfer allows for, e.g., feedback between two apparatuses, and/or simultaneous exchange of data. The two-way data transfer can be accomplished by utilizing multiple bundling of cables 902' (see FIG. 9 and discussion thereof), or layering of the cables (i.e., cables wrapped around a subsequent cable). Additionally, the optical fiber cable can be used to transfer data (one-way or two-way transfer) and provide power to a source (e.g., through use of multiple bundles of cables or layers of cables). Further, the optical fiber cables can be woven into a mesh-like structure, which can be random or organized, in order to provide multiple signals and multiple single paths. Implementations allow for both sensing of data relating to the flaps and spoilers (atmospheric and otherwise), and also control thereof. In this type of embodiment, the cable-based sensing/control system for aircraft flaps and spoilers is also exemplified by way of the basic diagram discussed in connection with FIG. 2 of U.S. Pat. No. 7,891, 611, (Huynh et al.) which is incorporated by references for this teaching.

Figure 21:
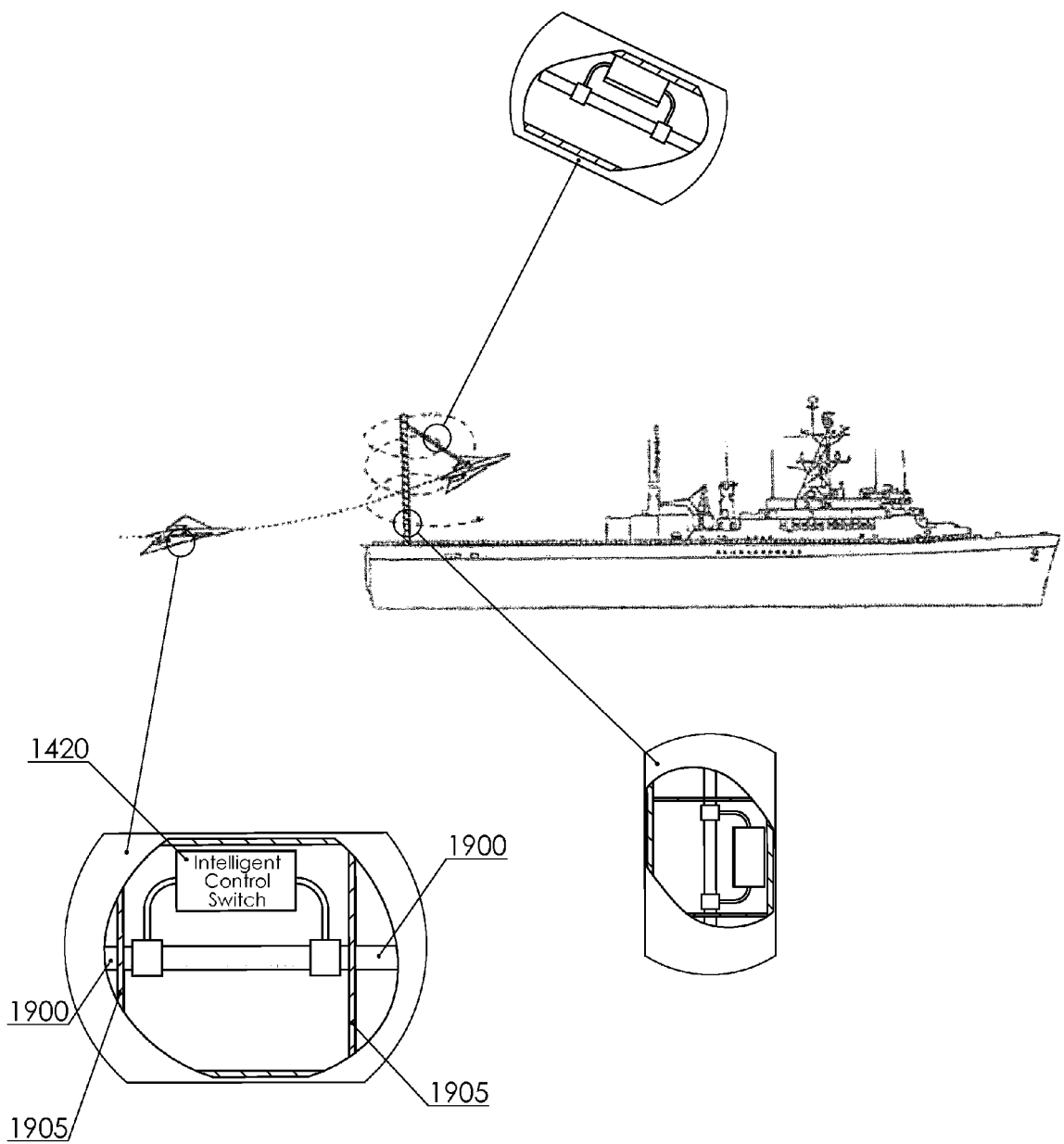
FIG. 21 shows a system for launch and recovery of an unmanned aerial vehicle using a pole member attached to a deck of a ship, consistent with various aspects of the present disclosure.

FIG. 21 shows a system for launch and recovery of an unmanned aerial vehicle using a pole member attached to a deck of a ship, an arm member attached to the pole being able to move rotationally around the pole (and sometimes up and down), and an attachment mechanism for holding and launching the aircraft, consistent with various aspects of the present disclosure. Including along each member is a flexible cable-based sensing system for determining the positioning of each member, and determining the grip strength on the attachment mechanism, and determining whether there was successful launch of the aircraft.

Implementation of the cable can include one-way transfer. Additionally, embodiments can be directed towards two-way data communication to provide signals, feedback based on the provided signals, and power to the aspects of the system (e.g., the grip on the attachment mechanism). Moreover, the optical fiber cables can be strung together utilizing smart interconnects 1402'. See, e.g., FIG. 14. In this manner, multiple fiber cables can be connected together, and the smart interconnects can be utilized to determine, for example, if there is a break in the chain. In this type of embodiment, the unmanned aircraft is also exemplified by way of the basic diagram discussed in connection with FIG. 6 of U.S. Pat. No. 8,028,952, (Urnes, Sr.) which is incorporated by references for this teaching.

Figure 22A:
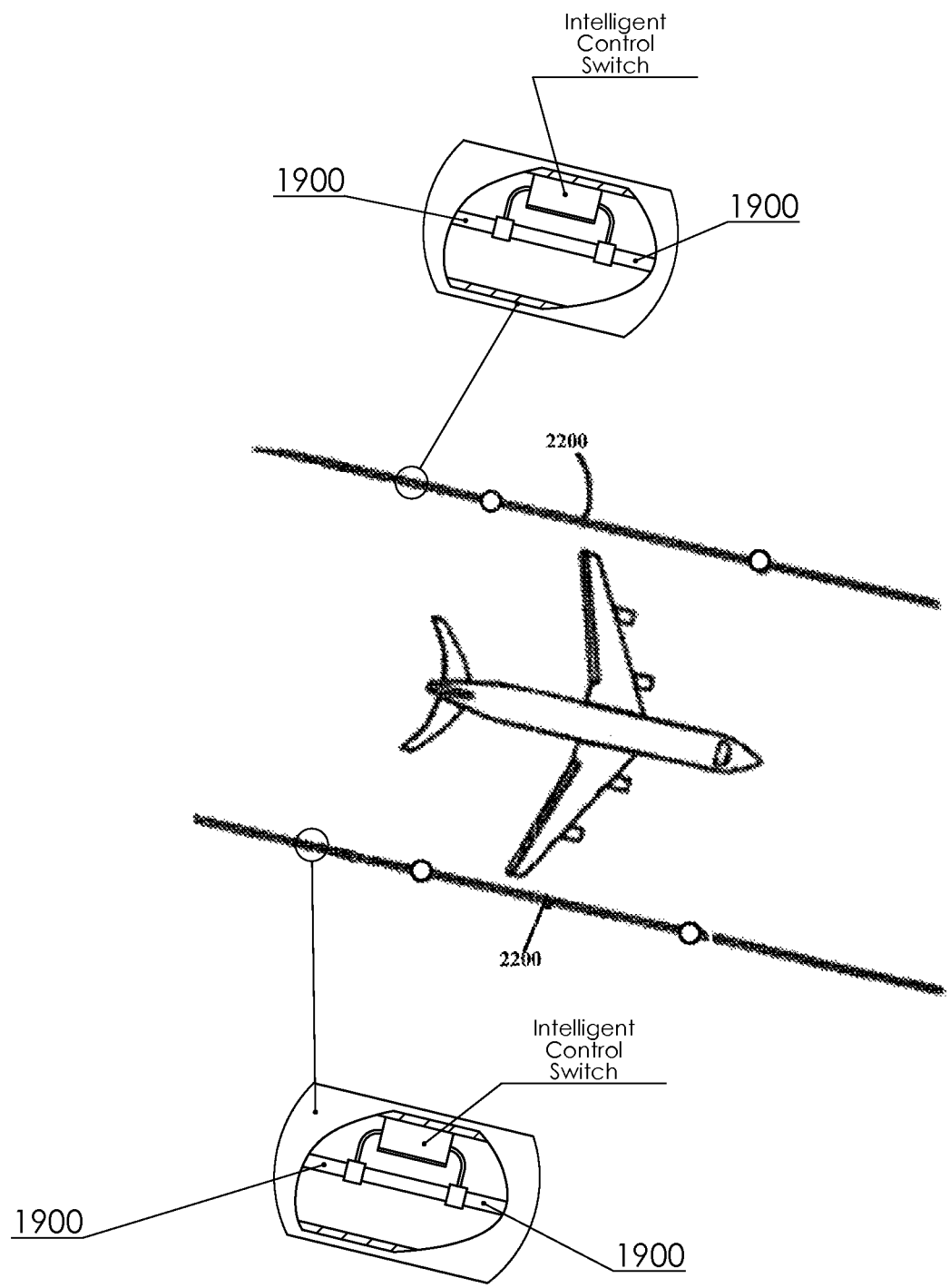
FIG. 22A shows an optical fiber cable arrangement, constructed with a glass or plastic optical fiber, which carries light along its length (including various layers of protective and strengthening materials surrounding the optical fiber), consistent with various aspects of the present disclosure.

FIG. 22A shows an optical fiber cable arrangement, constructed with a glass or plastic optical fiber, which carries light along its length (including various layers of protective and strengthening materials surrounding the optical fiber), consistent with various aspects of the present disclosure. The cables are included on the edges of a portable runway for an aircraft. The fibers are flexible such that the portable runway can be rolled for deployment, and rolled back up for carrying and storage. The cables include light paths for an aircraft landing at night. Additionally, the runway can include solar cells to charge the light paths during the day. In certain embodiments of this type, the illustrated arrangement serves as a hidden and portable runway so as to address environmental and usage concerns including optical fiber reliability problems such as damage to the fiber (i.e., the buffer layer and/or cladding layer), such as micro-cracks, that can grow with time when the optical fiber is exposed particularly in hostile environment conditions. The damage could result in reduced light transmission which can impede the necessary critical usages. The layers include hot melt thermal plastic material comprising EVA to facilitate self-healing of such damage in the optical fiber cable. In this type of embodiment, the portable runway is also exemplified by way of the basic diagram discussed in connection with FIG. 10 of U.S. Pat. No. 7,538,668, (Velhal et al.) which is incorporated by references for this teaching.

Figure 22B:
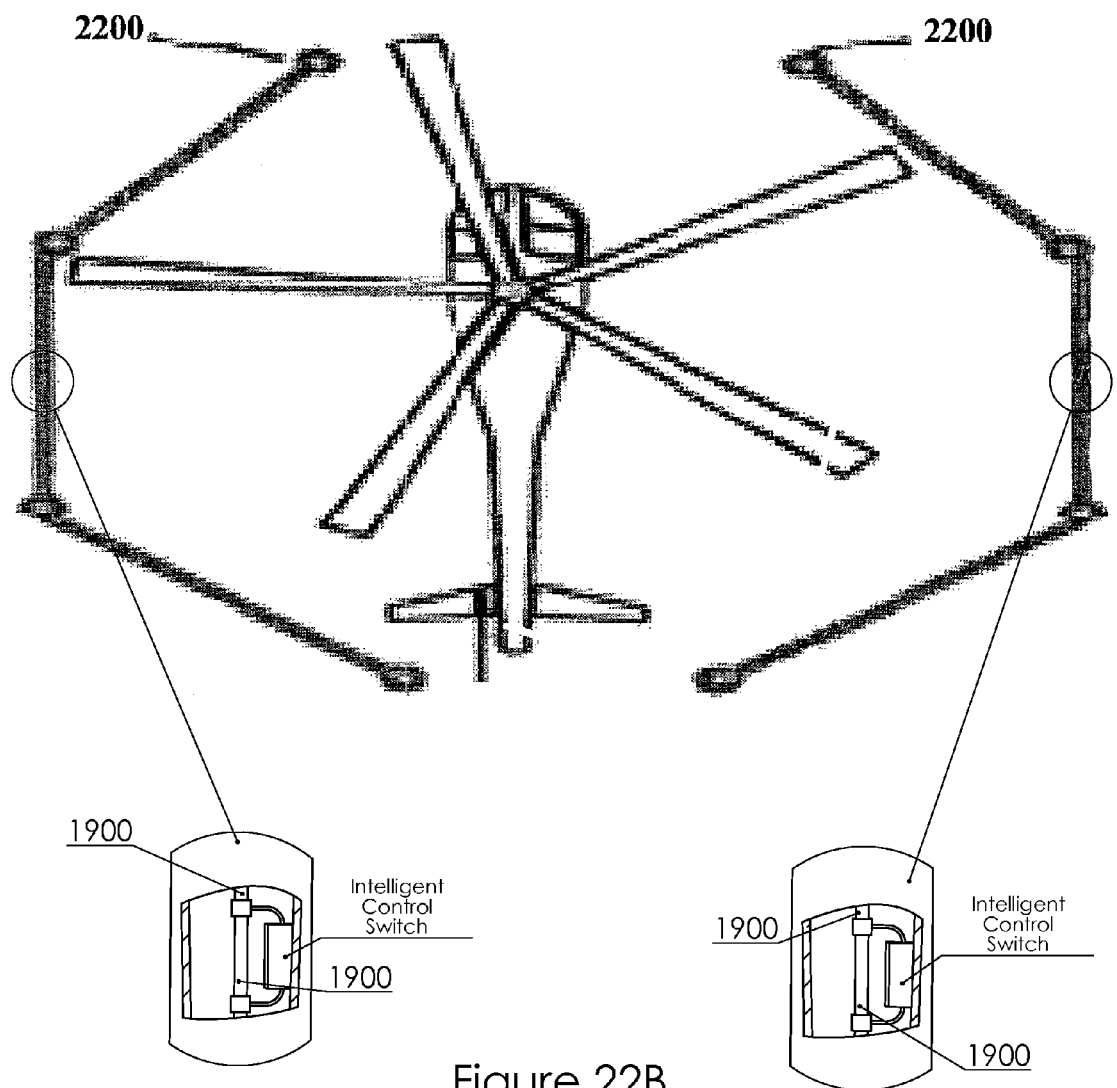
FIG. 22B shows an optical fiber cable arrangement, constructed with a glass or plastic optical fiber, which carries light along its edges, consistent with various aspects of the present disclosure.

FIG. 22B shows an optical fiber cable 2200 arrangement, constructed with a glass or plastic optical fiber, which carries light along its edges (including various layers of protective and strengthening materials surrounding the optical fiber), consistent with various aspects of the present disclosure. The base, surrounded by the edged light fibers, can be constructed of a mesh of the optical fiber cables 2200, as well as a protective covering (e.g., rubber, Kevlar) for an aircraft to land. The cables 2200 are included on the edges of a portable runway for an aircraft. The fibers are flexible such that the portable runway can be folded for deployment, and refolded for carrying and storage. The cables 2200 include light paths for an aircraft landing at night. Additionally, the runway can include solar cells to charge the light paths during the day. In certain embodiments of this type, the illustrated arrangement serves as a hidden and portable runway so as to address environmental and usage concerns including optical fiber reliability problems such as damage to the fiber (i.e., the buffer layer and/or cladding layer), such as micro-cracks, that can grow with time when the optical fiber is exposed particularly in hostile environment conditions. The damage could result in reduced light transmission which can impede the necessary critical usages. The layers include hot melt thermal plastic material comprising EVA to facilitate self-healing of such damage in the optical fiber cable 2200.

Figure 22C:
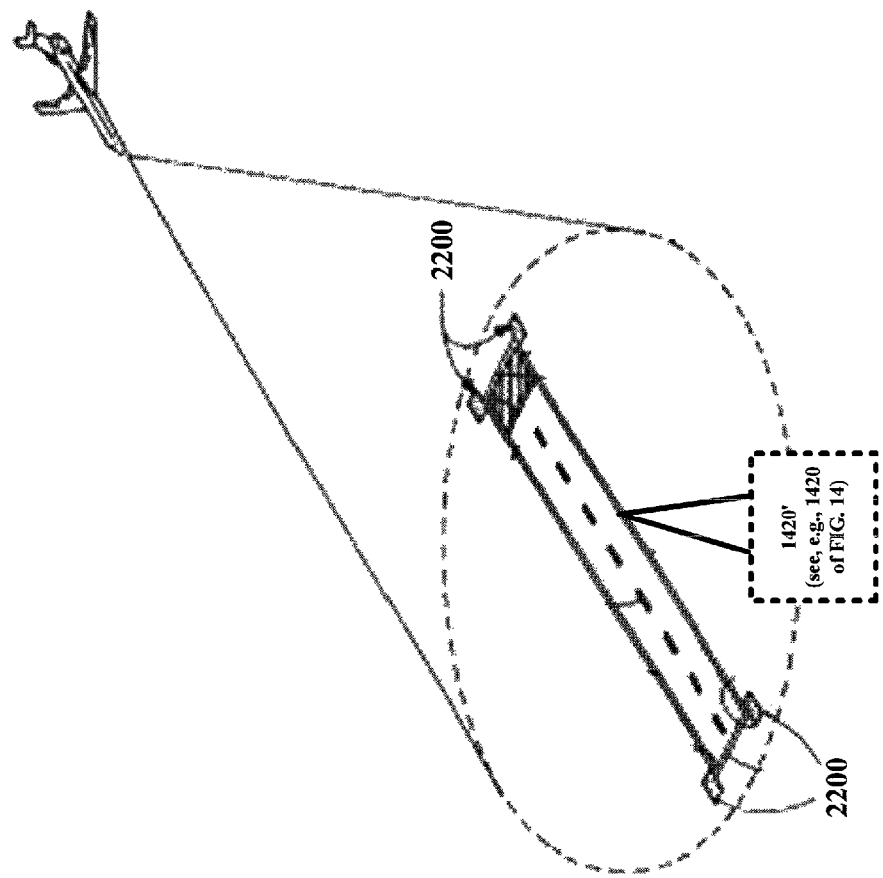
FIG. 22C shows an optical fiber cable arrangement, constructed with a glass or plastic optical fiber, which carries light along its length, consistent with various aspects of the present disclosure.

FIG. 22C shows an optical fiber cable 2200 arrangement, constructed with a glass or plastic optical fiber, which carries light along its length (including various layers of protective and strengthening materials surrounding the optical fiber), consistent with various aspects of the present disclosure. The cables 2200 are included on the edges of a portable runway for an aircraft. The fibers are flexible such that the portable runway can be rolled for deployment, and rolled back up for carrying and storage. The cables 2200 include light and/or remotely detectable paths for an aircraft landing at night, and using heat elements (responsive to current running through the cables 2200) the planes can view the runway by remote heat sensitive detection equipment (e.g., infrared sensors). Additionally, the runway can include solar cells to charge the light paths during the day. Further, the cables 2200 can include communications capabilities (e.g., production of an electric field, GPS) that could be sensed by incoming aircrafts to aid in navigation. Further, the base, surrounded by the edged light fibers, can be constructed of a mesh of the optical fiber cables 2200, as well as a protective covering (e.g., rubber, Kevlar) for an aircraft to land. In certain embodiments of this type, the illustrated arrangement serves as a hidden and portable runway so as to address environmental and usage concerns including optical fiber reliability problems such as damage to the fiber (i.e., the buffer layer and/or cladding layer), such as micro-cracks that can grow with time when the optical fiber is exposed, particularly in hostile environment conditions. The damage could result in reduced light transmission which can impede the necessary critical usages. The layers include hot melt thermal plastic material comprising EVA to facilitate self-healing of such damage in the optical fiber cable 2200.

Arrangements can include multiple bundles, and power can be provided to heating/lighting elements in order to allow for heat to be generated and maintained. The portable airstrip can be detected at night without lights that might compromise the location of the airstrip. Additionally, the cables 2200 can include control functionality such that the lighting and/or heating elements can be adjusted.

Implementations of the optical fiber cable 2200 arrangement can take multiple forms. For example, the cables 2200 can be used to provide light along the path to provide a viewing for a plane landing. Additionally, as the optical cable 2200 can include multiple bundles, power can be provided to heating elements in order to allow for heat to be generated and maintained. In this manner, aircrafts can use heat sensors (e.g., infrared sensors) to locate the portable airstrip, and use the head for guidance. The portable airstrip can be detected at night without lights that might compromise the location of the airstrip. Additionally, the cables 2200 can include control functionality such that the lighting and/or heating elements can be adjusted. The optical fiber cables 2200 can also be woven into a mesh-like structure, which can be random or organized, in order to provide multiple signals and multiple single paths, and provide heating and/or lighting elements to the entire base of the airstrip. Large numbers of signals can be exchanged while maintaining numerous pathways for which those signals can be exchanged (avoiding interrupt if one of the signals is cut). See, e.g., FIGS. 2-4 (and discussions thereof). The optical fiber cables 2200 can be strung together utilizing smart interconnects 1420'. See, e.g., FIG. 14. In this manner, multiple fiber cables 2200 can be connected together, and the smart interconnects can be utilized to determine, for example, if there is a break in the chain. In these types of embodiments, the portable runways are also exemplified by way of the basic diagram discussed in connection with FIG. 1 of U.S. Pat. No. 5,736,995, (Bohorquez et al.) which is incorporated by references for this teaching.

Figure 23A:
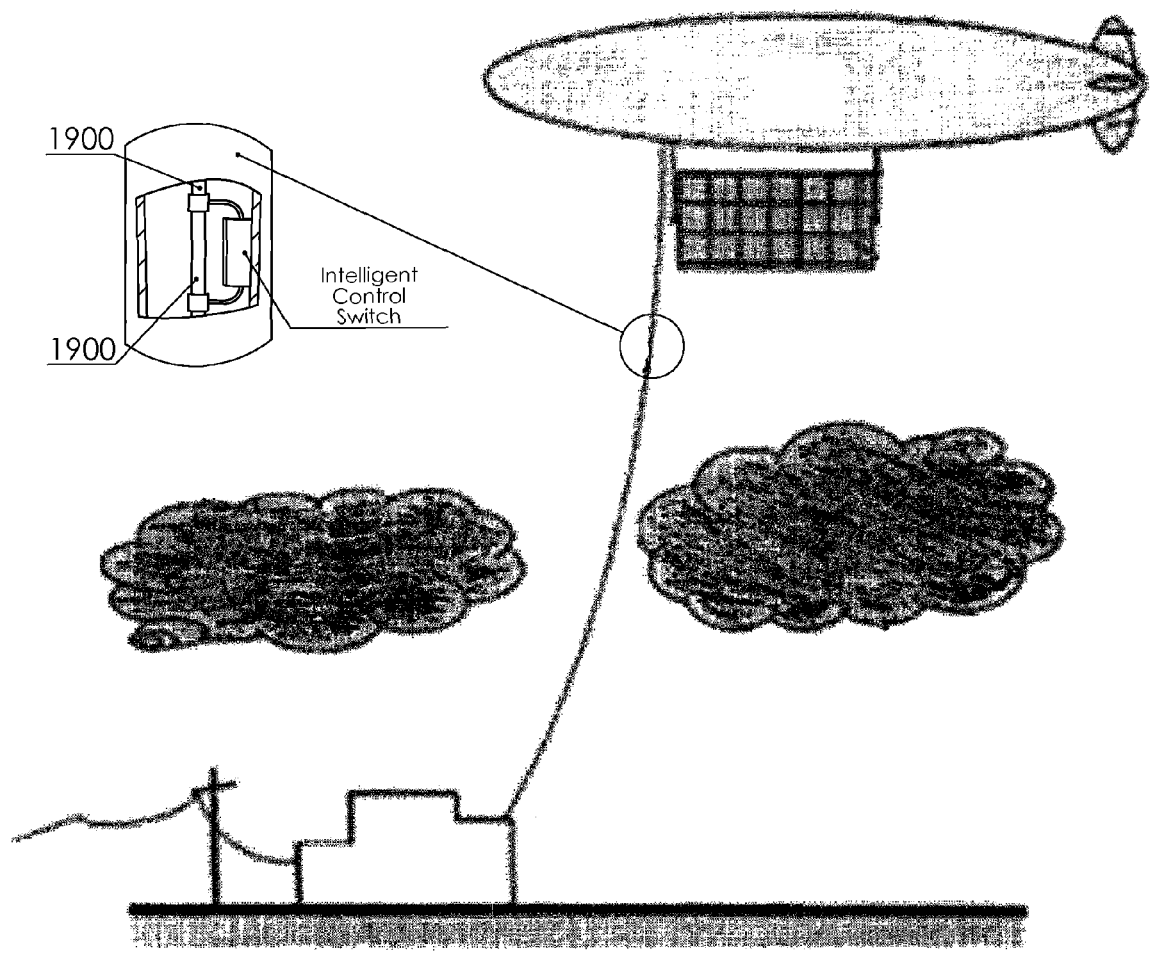
FIG. 23A shows a cable-based system for transferring and collecting converted sunlight electricity from an aircraft containing solar panels, consistent with various aspects of the present disclosure.

FIG. 23A shows a cable-based system for transferring and collecting converted sunlight electricity from an aircraft containing solar panels, consistent with various aspects of the present disclosure. The cable-based system includes cable(s) can also be strung along the aircraft to monitor atmospheric condition changes on critical flight surfaces (e.g., wings, stabilizers, rudders, ailerons, propulsion system components, fuselage of the aircraft) and flight control surfaces (e.g., ailerons, elevators, rudders, spoilers, flaps, slats, airbrakes, and/or other suitable control surfaces). The cable-based sensing system can run from the base station (where the solar energy is collected, stored, and processed) to the aircraft. The cable(s) include layers having different conductors for different mediums of communications such as measuring the many different surfaces and areas of interest on the aircraft, as well as the many atmospheric conditions that may be of interest. Specific applications include without limitation, aircraft, space, and marine environments to allow for monitoring of atmospheric conditions the entire length of the cable-based sensor system rather than only at the sensor's location. This approach also offsets need for multiple sensors and multiple wires for monitoring the multiple sensors, and the ability to collect solar electricity from an airborne aircraft while monitoring its flight and control surfaces.

Implementation of the cable(s) can include one-way or two-way data transfer. In an embodiment directed towards one-way data transfer, data can be transferred from a sensor to a control system. In two-way data communication, data transfer can from the sensor to the control system, and, for example, in response thereto, the control system can provide a signal to adjust the flight control surfaces. Further, the optical fiber cables can be woven into a mesh-like structure, which can be random or organized, in order to provide multiple signals and multiple single paths. In this manner, a large number of signals can be exchanged while maintaining numerous pathways for which those signals can be exchanged (avoiding interrupt if one of the signals is cut). See, e.g., FIGS. 2-4 (and discussions thereof). Moreover, the optical fiber cables can be strung together utilizing smart interconnects 1420'. See, e.g., FIG. 14. In this manner, multiple fiber cables can be connected together, and the smart interconnects can be utilized to determine, for example, if there is a break in the chain. In this type of embodiment, the tethering type of arrangement is also exemplified by way of the basic block diagram discussed in connection with FIG. 1 of U.S. Pat. No. 7,938,364, (Tillotson) which is incorporated by references for this teaching.

Figure 23B:
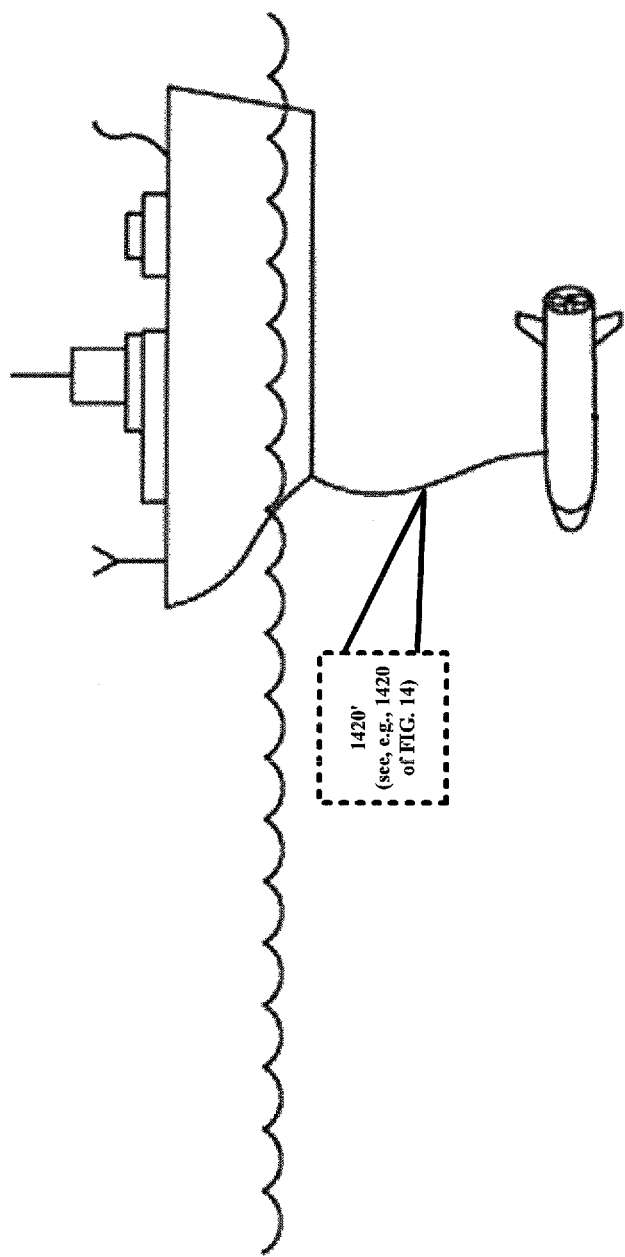
FIG. 23B shows a cable-based system for transferring and collecting data from an unmanned underwater vehicle (UUV), consistent with various aspects of the present disclosure.

FIG. 23B shows a cable-based system for transferring and collecting data from an unmanned underwater vehicle (UUV) that may be used in a variety of applications, such as mapping the ocean floor or training a submarine crew, consistent with various aspects of the present disclosure. The cable-based system can also be strung along the outside of the UUV to monitor atmospheric condition changes on surfaces of the UUV. The cable-based sensing system can run from a base station (where the data is collected, stored, and processed) to the UUV. The cable-based system addresses environmental and usage concerns including optical fiber reliability problems such as damage to the fiber (i.e., the buffer layer and/or cladding layer), such as micro-cracks, that can grow with time when the optical fiber is exposed particularly in hostile environment conditions. The damage could result in reduced light transmission which can impede the necessary critical usages. The layers include hot melt thermal plastic material comprising EVA to facilitate self-healing of such damage in the optical fiber cable.

Implementation of the cable can include one-way or two-way data transfer. In an embodiment directed towards one-way data transfer, data can be transferred from a watercraft to a submerged UUV. The two-way data transfer can allow for data to also be transferred, simultaneously from the submerged UUV to the watercraft. Moreover, the optical fiber cables can be strung together utilizing smart interconnects 1420'. See, e.g., FIG. 14. In this manner, multiple fiber cables can be connected together, and the smart interconnects can be utilized to determine, for example, if there is a break in the chain. In this type of embodiment, the tethering type of arrangement is also exemplified by way of the basic block diagram discussed in connection with FIG. 1 of U.S. Pat. No. 8,102,733, (Rapp et al) which is incorporated by references for this teaching.

Figure 23C:
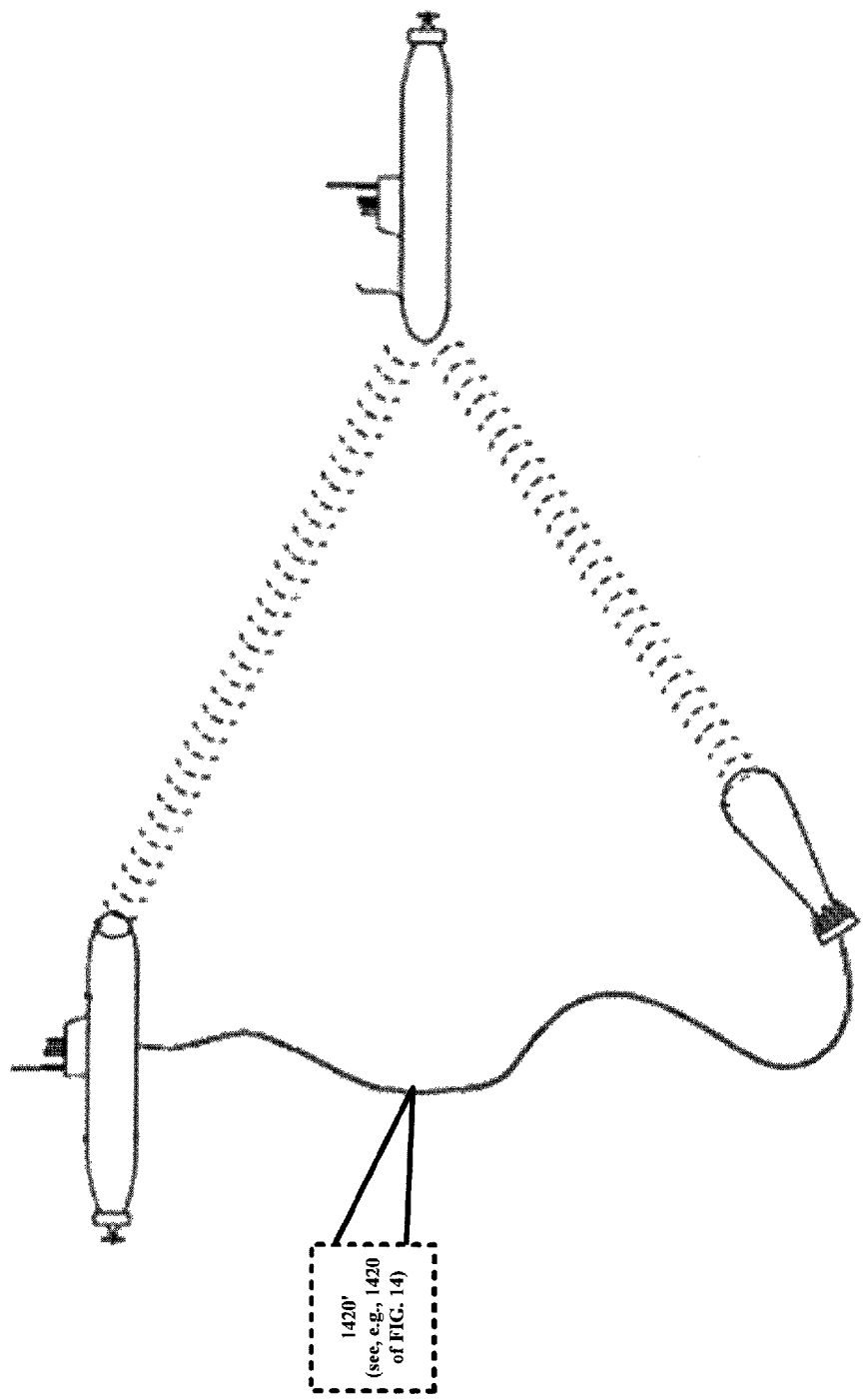
FIG. 23C shows a cable-based system for transferring and collecting data from a data collector to a submarine or an unmanned underwater vehicle (UUV), consistent with various aspects of the present disclosure.

FIG. 23C shows a cable-based system for transferring and collecting data from a data collector (e.g., sonar beacon, environmental sensor) to a submarine or a UUV, consistent with various aspects of the present disclosure. The cable-based system may be used in a variety of applications, such as for example, mapping the ocean floor, detection of possible torpedoes, and detection of environmental conditions (e.g., ecosystem characteristics). The cable-based system can also be strung along the outside of the submarine/UUV to monitor atmospheric condition changes on surfaces thereof. The cable-based sensing system can run from submarine/UUV (where the data is collected, stored, and processed) to the data collector. The cable-based system addresses environmental and usage concerns including optical fiber reliability problems such as damage to the fiber (i.e., the buffer layer and/or cladding layer), such as micro-cracks, that can grow with time when the optical fiber is exposed particularly in hostile environment conditions. The damage could result in reduced light transmission which can impede the necessary critical usages. The layers include hot melt thermal plastic material comprising EVA to facilitate self-healing of such damage in the optical fiber cable.

Implementation of the cable can include one-way or two-way data transfer. In an embodiment directed towards one-way data transfer, data can be transferred from a sensor to the submarine/UUV. In two-way data communication, data transfer can from the submarine/UUV to the sensor, and, for example, in response thereto, the submarine/UUV can provide a signal to adjust the sensor. Further, as the cables can be provided on the submarine/UUV surface, data can be simultaneously collected therefrom. Additionally, the optical fiber cables can be woven into a mesh-like structure, which can be random or organized, in order to provide multiple signals and multiple single paths, and laid over the exterior of the submarine/UUV to collect atmospheric changes on the surface of the submarine/UUV. In this manner, a large number of signals can be exchanged while maintaining numerous pathways for which those signals can be exchanged (avoiding interrupt if one of the signals is cut). See, e.g., FIGS. 2-4 (and discussions thereof). Moreover, the optical fiber cables can be strung together utilizing smart interconnects 1420'. See, e.g., FIG. 14. In this manner, multiple fiber cables can be connected together, and the smart interconnects can be utilized to determine, for example, if there is a break in the chain. In this type of embodiment, the tethering type of arrangement is also exemplified by way of the basic block diagram discussed in connection with FIG. 21 of U.S. Pat. No. 7,984,581, (Rapp et al.) which is incorporated by references for this teaching.

According to another specific example embodiment, a cable-based sensing system carries signals from a number of sensors identifying various types of events (acoustic, visual), consistent with various aspects of the present disclosure. This cable is useful in connection with transmitting a variety of signals from various sensors to a centralized location 1805 for processing. The layers include different conductors for different mediums of communications such as optical fiber cable for high-speed data such as video and, via conductive paths in the same cable, concurrent communication of other data such as events relating to acoustics (e.g., gun shots, yelling, shouting) and visual events (e.g., unauthorized trespassing, suspicious activity) and such as other end-point nodes for indicating events that occur at the sensor location. Specific applications include without limitation, aircraft, space, marine, and outdoor environments to minimize the amount of cabling needed to provide multiple communication bussing. This approach also offsets need multiple systems and platforms needed in order to increase the ability for law enforcement agencies to respond to these types of events.

In this embodiment, the cable(s) can provide one-way or two-way data transfer. In an embodiment directed towards one-way data transfer, data can be transferred from a sensor to the event detection system. In two-way data communication, data transfer can from the sensor to the event detection center, and, for example, in response thereto, the data detection center can provide a signal to adjust the sensor (e.g., reposition, calibrate, increase sensing rate). The cables can be strung together utilizing smart interconnects. See, e.g., FIG. 14. In this manner, multiple fiber cables can be connected together, and the smart interconnects can be utilized to determine, for example, if there is a break in the chain. In this type of embodiment, an event detection system for detecting such above-discussed events is exemplified by way of the basic block diagram discussed in connection with FIG. 4 of U.S. Pat. No. 8,125,334, (Loyal et al.) which is incorporated by references for this teaching.

According to another specific example embodiment, a cable-based system provides for calibration of dynamic pressures sensors utilizing a flexible high intensity calibration device to enhance the placement and positioning of the calibration device, while mitigating possible damage to the device based on the seal of the sensor, and necessary flexibility and movement of the calibration device, consistent with various aspects of the present disclosure. The cable-based calibration system includes cable(s) that can run to multiple dynamic pressure sensors inside and outside of an aircraft. The cable-based calibration system has the ability to run to multiple different sensors and decrease wiring. The layers include different conductors for different communications of the different dynamic pressure sensors. Specific applications include without limitation, aircraft, space, and marine environments to mitigate damage of the cable-based system due to monitoring of sensors in places requiring flexibility of the device in order to reach the sensor. This approach also offsets need for multiple sensors and multiple wires for monitoring the multiple sensors.

Implementation of the cable(s) can include one-way or two-way data transfer. In an embodiment directed towards one-way data transfer, data can be transferred from a device to a calibration head. In two-way data communication, data transfer can occur from the calibration head to the sensor, and, for example, in response thereto, the sensor can provide a signal to adjust the calibration head. This calibration device can be utilized in automotive (e.g., cars, aircraft, ships) to calibrate different devices/sensors. In this type of embodiment, a calibration system for calibrating such sensors discussed above is exemplified by way of the basic block diagram discussed in connection with FIG. 1 of U.S. Pat. No. 8,107,634 (Gratzer et al.) which is incorporated by references for this teaching.

According to another specific example embodiment, an optical fiber cable operates as an electric field sensor (i.e., electric field whistle) as would be displaced on the exterior of an aircraft, consistent with various aspects of the present disclosure. The optical fiber cable, shown with four different example arrangements and circuitry, can provide warning of lightning strikes based on the sensed electrical field change on the exterior of the aircraft. The fiber cable can run the entire length of the body of the fuselage, and the wings of the aircraft to provide continuous sensing over the entire body of the aircraft, thereby, enhancing the potential for sensing even minor changes in the electric field. In certain embodiments of this type, the illustrated arrangement serves to address environmental and usage concerns including optical fiber reliability problems such as damage to the buffer layer and/or cladding layer, such as micro-cracks, that can grow with time when the optical fiber is exposed particularly in hostile environment conditions and such as reduced light transmission which can impede the necessary critical usages. The layers, length, and flexibility of the optical fiber cable can be shaped, as shown in the example arrangements, to allow for allover coverage of the aircraft to enhance accurate sensing of electric field changes while maintaining structural integrity of the optical fiber cable. Specific applications include without limitation, space, and marine operations/environments to measure electric field by removing the need for moving parts in a sensor and maximizing sensor coverage.

In an embodiment directed towards one-way data transfer, data can be transferred from the electric field whistle to a control center of an aircraft (e.g., using a radio receiver) to indicate warnings of lightning strikes. Further, the optical fiber cables can be woven into a mesh-like structure (see, e.g., FIGS. 2-4), which can be random or organized, in order to provide multiple signals and multiple single paths, and for greater coverage of the fuselage and airplane wings to provide a more accurate sense of electric field changes. Moreover, the optical fiber cables can be strung together utilizing smart interconnects. See, e.g., FIG. 14. In this manner, multiple fiber cables can be connected together, and the smart interconnects can be utilized to determine, for example, if there is a break in the chain. In this type of embodiment, electric field sensors discussed above are exemplified by way of the figures discussed in connection with FIGS. 1A-E of U.S. Pat. No. 8,049,633, (Anway) which is incorporated by references for this teaching.

According to another specific example embodiment, an optical fiber cable with a glass or plastic optical fiber carry light and/or electrical signals along a path, which includes various protective and strengthening materials surrounding the optical fiber used for accurately counting the number of turns (and fractional increments thereof) that a driven part is turned for adjustment to a target or optimal position, consistent with various aspects of the present disclosure. For example, airplane wings commonly use telescopic plane surfaces to temporarily increase wing surface and curvature during take-off and landing phases. These telescopic plane surfaces are also used to increase lift effect at low speed when leading and trailing edges are equipped with extendable/retractable ancillary wing surfaces which are actuated by a single rotary motor connected to a chain of jackscrews linked/synchronized together by torque tubes. To ensure mechanical axial compliance during wing flex or under ambient temperature variation, each torque tube for adjacent gearboxes is connected through a splined shaft. The synchronization of each gearbox to insure a true parallel movement of leading and trailing edges of the wing's main beam is dependent on an exact angular indexing of each gearbox input splined shaft. The cables are used to carry the signals from the gearbox. Further, the layers of the cables include hot melt thermal plastic material comprising EVA to facilitate self-healing of such damage in the optical fiber cable so that the cable does not have to be replaced when it is damaged. Specific applications include without limitation, space, and marine operations/environments to provide a revolution counter tool that can keep precise count of the number of turns/increments of angular indexing of a gearbox or motor-driven part so that it can be returned to its optimal position during installation or repair, and even by a different mechanic. Implementation of the cable can include one-way transfer, and use for light sensing as further discussed with reference to FIG. 5. In this type of embodiment, the optical fiber discussed above are exemplified by way of the figures discussed in connection with FIG. 6 of U.S. Pat. No. 8,020,753, (Wheeler et al.) which is incorporated by references for this teaching.

According to another specific example embodiment, an optical fiber cable with a glass or plastic optical fiber that carries light along its length and various layers of protective and strengthening materials surrounding the optical fiber, consistent with various aspects of the present disclosure. The multiple layers of the cable for use in an arc fault monitoring system that replaces the need for numerous sensor units and numerous optical cables. The fiber can be strung along the power lines, as located between a power supply and a load, and replace sensor units located at multiple locations along the line. This allows for continuous sensing along the power lines rather than only sensing in locations where sensors are placed. The faults that can be monitored by the optical fiber cable include hard faults (e.g., with loose connections and/or reduced integrity of the power lines), which may occur through an open and/or short condition in a power line. Additionally, intermittent faults (e.g., faults that may occur periodically and/or randomly), such as an arcing fault (which may occur when power is transferred to a load other than those that are known) can be monitored. The continuous sampling along the power lines by the optical fiber allows for continuous monitoring of faults along the power lines. Additionally, layers include hot melt thermal plastic material comprising EVA to facilitate self-healing of such damage in the optical fiber cable that may result due to the environmental conditions.

Implementation of the cable can include one-way transfer. Additionally, embodiments can be directed towards two-way data communication to provide signals and feedback based on the provided signals. Moreover, the optical fiber cables can be strung together utilizing smart interconnects. See, e.g., FIG. 14. In this manner, multiple fiber cables can be connected together, and the smart interconnects can be utilized to determine, for example, if there is a break in the chain. In this type of embodiment, the connections between power supply and a load discussed above are exemplified by way of the figures discussed in connection with FIG. 4 of U.S. Pat. No. 7,940,055, (Hanes et al.) which is incorporated by references for this teaching.

According to another specific example embodiment, an optical fiber cable-based communication system transfers data relating to monitoring and operational data of an aircraft, consistent with various aspects of the present disclosure. The data generated by an aircraft can include, but is not limited to: data from engines monitored at every stage of operation (e.g., compression ratios, rotation rate (RPM), temperature, and vibration data); fuel data, maintenance data, airplane health monitoring, operational information, catering data, in-flight entertainment equipment updates, and passenger data (e.g., Wi-Fi payment and use; duty free shopping; telephone calls). The cable can offer sufficient bandwidth for data transfer to and from the aircraft without need for multiple cables for each data that is to be collected. Additionally, if the aircraft is retrofitted with cable-based sensing systems, as described in other embodiments of the instant disclosure, the instant cable-based communication can collect the data associated therewith. The single cable can include multiple layers of different conductors (for different mediums of communications and different data transfers) or multiple internal cords that can transfer multiple data streams simultaneously. This approach also offsets need for multiple wires to collect and transfer data from an aircraft operation. Additionally, as the cable can include multiple layers or multiple internal cables, data (or updates) relating to future endeavors can be transferred to the aircraft while the previous data is downloaded. Implementation of the cable can include one-way or two-way data transfer. In an embodiment directed towards one-way data transfer, data can be transferred from an aircraft to a collection point. In two-way data communication, data transfer can from the aircraft to the collection point, and simultaneously upload new data from the collection point to the aircraft. In this type of embodiment, the systems for monitoring and operational data of an aircraft discussed above are exemplified by way of the figures discussed in connection with FIG. 1 of U.S. Pat. No. 7,893,557, (Davis et al.) which is incorporated by references for this teaching.

According to another specific example embodiment, an optical fiber cable operate as a proximity sensor displaced on the exterior of an aircraft along the fuselage and the wings, consistent with various aspects of the present disclosure. During pre-flight and post-flight procedures, numerous vehicles are present around an aircraft. The optical fiber cable operates prevent collision of those numerous vehicles with the aircraft. The optical fiber can be spread along the fuselage and wings as a single cord, a random mesh, or an organized mesh (for example) to provide allover coverage of the aircraft, and thus allover coverage for proximity detection. The cable system can be connected to an audible alarm that warns vehicles of impending collision. Alternatively or in addition to, the ground vehicles can be equipped with a similar cable proximity sensor system to operate with the system on the aircraft and indicate impending collision. The environmental and usage concerns such as damage (e.g., micro-cracks that can grow with time when the optical fiber is exposed) resulting in hostile environment conditions (which reduce light/data transmission) are alleviated by the layers, length, and flexibility of the optical fiber cable. Specific applications include without limitation, space, and marine operations/environments to measure electric field by removing the need for moving parts in a sensor and maximizing sensor coverage.

In an embodiment directed towards one-way data transfer, data can be transferred from a proximity sensor and to a source, which will give an indication (i.e., an audible alarm) of whether a ground vehicle is too close. Two-way data communication, as described with reference to embodiment A, for example, can also be implemented for feedback purposes and providing power. Further, the optical fiber cables can be woven into a mesh-like structure, which can be random or organized, in order to provide multiple signals and multiple single paths, and allover coverage of an aircraft (providing proximity sensors covering a larger area of an aircraft). In this manner, a large number of signals can be exchanged while maintaining numerous pathways for which those signals can be exchanged (avoiding interrupt if one of the signals is cut). See, e.g., FIGS. 2-4 (and discussions thereof). Moreover, the optical fiber cables can be strung together utilizing smart interconnects. See, e.g., FIG. 14. In this manner, multiple fiber cables can be connected together, and the smart interconnects can be utilized to determine, for example, if there is a break in the chain. In this type of embodiment, proximity sensors discussed above are exemplified by way of the figures discussed in connection with FIG. 2 of U.S. Pat. No. 7,869,305, (Anderson et al.) which is incorporated by references for this teaching.

According to another specific example embodiment, a cable-based system for transfer and collection data from a data collector (e.g., sonar beacon, environmental sensor) to a ship is provided, consistent with various aspects of the present disclosure. The cable-based system may be used in a variety of applications, such as for example, mapping the ocean floor, detection of possible torpedoes, and detection of environmental conditions (e.g., ecosystem characteristics). The cable-based sensing system can run from ship (where the data is collected, stored, and processed) to the data collector. The cable-based system addresses environmental and usage concerns including optical fiber reliability problems such as damage to the fiber (i.e., the buffer layer and/or cladding layer), such as micro-cracks, that can grow with time when the optical fiber is exposed particularly in hostile environment conditions. The damage could result in reduced light transmission which can impede the necessary critical usages. The layers include hot melt thermal plastic material comprising EVA to facilitate self-healing of such damage in the optical fiber cable.

Implementation of the cable can include one-way or two-way data transfer. In an embodiment directed towards one-way data transfer, data can be transferred from a watercraft to a submerged sensor. The two-way data transfer can allow for data to also be transferred, simultaneously from the submerged sensor to the watercraft. Moreover, the optical fiber cables can be strung together utilizing smart interconnects. See, e.g., FIG. 14. In this manner, multiple fiber cables can be connected together, and the smart interconnects can be utilized to determine, for example, if there is a break in the chain. In this type of embodiment, the data collection discussed above are exemplified by way of the figures discussed in connection with FIG. 1 of U.S. Pat. No. 6,791,490, (King) which is incorporated by references for this teaching.

According to another specific example embodiment, a cable-based system is provided for transferring, transmitting, and collecting data to and from a scuba diver and a data station, consistent with various aspects of the present disclosure. The cable-based system may be used in a variety of applications, such as for example, communicating GPS information to the scuba diver, communicating dive related information (e.g., oxygen content, length of dive, depth of dive) from the data station to the scuba diver, collecting information from the diver (e.g., based on environmental sensors carried by the diver, based on a computer carried by the diver), and collecting information from the diver such as mapping the ocean floor, detection of possible torpedoes, and detection of environmental conditions (e.g., ecosystem characteristics). The cable-based sensing system can run from data station (where the data is collected, stored, and processed) to the scuba diver. The cable-based system addresses environmental and usage concerns including optical fiber reliability problems such as damage to the fiber (i.e., the buffer layer and/or cladding layer), such as micro-cracks, that can grow with time when the optical fiber is exposed particularly in hostile environment conditions. The damage could result in reduced light transmission which can impede the necessary critical usages. The layers include hot melt thermal plastic material comprising EVA to facilitate self-healing of such damage in the optical fiber cable.

Implementation of the cable can include one-way or two-way data transfer. In an embodiment directed towards one-way data transfer, data can be transferred from a data station to a submerged scuba diver. The two-way data transfer can allow for data to also be transferred, simultaneously from the submerged scuba diver to the data station. Moreover, the optical fiber cables can be strung together utilizing smart interconnects. See, e.g., FIG. 14. In this manner, multiple fiber cables can be connected together, and the smart interconnects can be utilized to determine, for example, if there is a break in the chain. In this type of embodiment, the data collection discussed above are exemplified by way of the figures discussed in connection with FIG. 1 of U.S. Pat. No. 6,807,127, (McGeever, Jr.) which is incorporated by references for this teaching.

According to another specific example embodiment, a cable-based system is provided for transferring, transmitting, and collecting data to and from a dive cage and a data station, consistent with various aspects of the present disclosure. The cable-based system may be used in a variety of applications, such as for example, communicating GPS information to the diver in the dive cage, communicating dive relating information (e.g., oxygen content, length of dive, depth of dive) from the data station to the dive cage, collecting information from the dive cage (e.g., based on environmental sensors carried by the diver, based on a computer carried by the diver), and collecting information from the dive cage such as mapping the ocean floor, detection of possible torpedoes, and detection of environmental conditions (e.g., ecosystem characteristics). The cable-based sensing system can run from data station (where the data is collected, stored, and processed) to the dive cage. The cable-based system addresses environmental and usage concerns including optical fiber reliability problems such as damage to the fiber (i.e., the buffer layer and/or cladding layer), such as micro-cracks, that can grow with time when the optical fiber is exposed particularly in hostile environment conditions. The damage could result in reduced light transmission which can impede the necessary critical usages. The layers include hot melt thermal plastic material comprising EVA to facilitate self-healing of such damage in the optical fiber cable.

Implementation of the cable can include one-way or two-way data transfer. In an embodiment directed towards one-way data transfer, data can be transferred from a data station to a submerged dive cage. The two-way data transfer can allow for data to also be transferred, simultaneously from the submerged dive cage to the data station. Moreover, the optical fiber cables can be strung together utilizing smart interconnects. See, e.g., FIG. 14. In this manner, multiple fiber cables can be connected together, and the smart interconnects can be utilized to determine, for example, if there is a break in the chain. In this type of embodiment, the data collection discussed above are exemplified by way of the figures discussed in connection with FIG. 9 of U.S. Pat. No. 6,807,127, (McGeever, Jr.) which is incorporated by references for this teaching.

According to another specific example embodiment, a neural network is provided that learns the operating modes of a system being monitored under normal operating conditions, consistent with various aspects of the present disclosure. Anomalies can be automatically detected and learned. A control command can be issued or an alert can be issued in response thereto. The nodes and different sensors are each connected using a cable-based system for transferring, transmitting, and collecting data, as shown in the figure below. The cable-based system addresses environmental and usage concerns including optical fiber reliability problems such as damage to the fiber (i.e., the buffer layer and/or cladding layer), such as micro-cracks, that can grow with time when the optical fiber is exposed particularly in hostile environment conditions. The damage could result in reduced light transmission which can impede the necessary critical usages. The layers include hot melt thermal plastic material comprising EVA to facilitate self-healing of such damage in the optical fiber cable.

In this example, the cables can provide one-way or two-way data transfer. In an embodiment directed towards one-way data transfer, data can be transferred from a sensor to the system center. In two-way data communication, data transfer can from the sensor to the system center, and, for example, in response thereto, the system center can provide a signal to adjust the sensor (e.g., reposition, calibrate, increase sensing rate). The cables can be strung together utilizing smart interconnects. See, e.g., FIG. 14. In this manner, multiple fiber cables can be connected together, and the smart interconnects can be utilized to determine, for example, if there is a break in the chain. In this type of embodiment, the neural network discussed above are exemplified by way of the figures discussed in connection with FIG. 1 of U.S. Pat. No. 7,917,335, (Harrison et al.) which is incorporated by references for this teaching. Various modules and/or other circuit-based building blocks may be implemented to carry out one or more of the operations and activities described herein and/or shown in the figures. In such contexts, a "module" is a circuit that receives and/or transmits optical signals and/or electrical signals over flexible cables, consistent with the above discussion. For example, in certain of the above-discussed embodiments, one or more modules are discrete logic circuits or programmable logic circuits configured and arranged for implementing these operations/activities, as in the circuit modules shown in the FIGS. 2-6, 10-12.

As indicated above in connection with the incorporated teachings from the underlying provisional patent documents, corresponding aspects setting forth embodiments for the present invention are discussed and claimed in concurrently-filed U.S. patent application Ser. No. 13/849,229 assigned to the same assignee and entitled: "CABLE/GUIDEWIRE/INTERCONNECTS COMMUNICATION APPARATUS AND METHODS". All such common teaching is hereby incorporated by reference. For example, the embodiments herein incorporate the common teachings disclosed in U.S. patent applications, Ser. No. 12/804,271 ("DURABLE FINE WIRE ELECTRICAL CONDUCTOR SUITABLE FOR EXTREME ENVIRONMENT APPLICATIONS") and Ser. No. 12/887,388 ("ELECTRODE AND CONNECTOR ATTACHMENTS FOR A CYLINDRICAL GLASS FIBER FINE WIRE LEAD") pertaining to the connectors and fine wire lead as described and/or illustrated therein.

Based upon the above discussion and illustrations, those skilled in the art will readily recognize that various modifications and changes may be made to the present invention without strictly following the exemplary embodiments and applications illustrated and described herein. Such modifications do not depart from the true spirit and scope of the present invention, including that set forth in the following claims.

What is claimed is:

1. A communication circuit for communicating between a plurality of compartments in a vehicle, the communication circuit comprising:
    an array of flexible cables configured and arranged to provide signal-communication paths between the plurality of compartments in the vehicle, each cable:
        including a glass or silica core region for conveying optical signals,
        being configured and arranged to communicate signals along at least one of the signal-communication paths and between the plurality of compartments in the vehicle, the signals including electrical signals and optical signals, and
    a plurality of circuits including a first circuit located at a proximate location along the array of flexible cables and secondary circuits located at distal locations along the array of flexible cables, the plurality of circuits configured and arranged to communicate status-indication signals between the locations along the array of flexible cables, the status-indication signals being communicated via the signal-communication paths in the flexible array of cables and being indicative of a first vehicle-travel mode for reporting a status of the vehicle in a mode relative to travel of the vehicle, whereby the first circuit is configured and arranged to receive the status-indication signals from the secondary circuits, and in response thereto, report or analyze the vehicle based on the status of the vehicle, as indicated at the distal locations, for a mode relative to travel of the vehicle.

2. The communication circuit of claim 1, wherein the glass or silica core region has a physical characteristic that is limited by an outer dimension that is less than 750 microns and further including a conductive cladding surrounding the core region.

3. The communication circuit of claim 1, wherein the status-indication signals are indicative of an operating function of one or more of: functionality of exterior control surfaces of the vehicle, positioning of wing flaps of the vehicle, alignment of control surfaces of the vehicle, atmospheric conditions of critical surfaces of the vehicle, and position of wheels of the vehicle.

4. The communication circuit of claim 1, wherein the status-indication signals are indicative of seating status of passengers in the vehicle.

5. The communication circuit of claim 1, wherein the vehicle-travel mode is at least one of a steady-state movement mode of the vehicle, an acceleration mode of the vehicle, and a deceleration mode of the vehicle.

6. The communication circuit of claim 1, wherein the vehicle is a terrain-vehicle or an automobile in which the first circuit collects vehicle-safety data regarding the status of vehicle while the vehicle or automobile is traveling.

7. The communication circuit of claim 1, wherein the signal-communication paths are further configured and arranged to pass redundant status-indication signals of mechanical aspects of the vehicle and wherein the vehicle is an unmanned aerial vehicle or a manned aircraft vehicle in which the first circuit collects vehicle-safety data regarding the status of vehicle while the unmanned aerial vehicle or a manned aircraft vehicle is traveling.

8. The communication circuit of claim 1, wherein the signal-communication paths are further configured and arranged to pass complimentary status-indication signals of mechanical aspects of the vehicle.

9. The communication circuit of claim 1, wherein the signal-communication paths are further configured and arranged to provide a two-way data pathway.

10. The communication circuit of claim 1, wherein each cable includes at least one electrically exposed portion, and wherein the cable is further configured and arranged to detect conductive changes in a material of the cable in contact with the at least one electrically exposed portion.

11. The communication circuit of claim 10, wherein the conductive changes are indicative of unwanted moisture.

12. The communication circuit of claim 1, wherein each cable includes at least one optically exposed portion, and wherein the cable is further configured and arranged to detect optical changes in the cable in contact with the at least one optically exposed portion.

13. The communication circuit of claim 1, wherein the secondary circuits are configured and arranged with mechanical aspects of the vehicle and communicate status-indication signals of the mechanical aspects.

14. A communication circuit for communicating between a plurality of compartments in an unmanned aerial vehicle, the communication circuit comprising:

an array of flexible cables configured and arranged to provide signal-communication paths between the plurality of compartments in the vehicle, each cable:
including a glass or silica core region for conveying optical signals,
being configured and arranged to communicate signals along at least one of the signal-communication paths and between the plurality of compartments in the vehicle, the signals including electrical signals and optical signals, and a plurality of circuits including a first circuit located at a proximate location along the array of flexible cables and secondary circuits located at distal locations along the array of flexible cables, the plurality of circuits configured and arranged to communicate status-indication signals between the locations along the array of flexible cables, the status-indication signals being communicated via the signal-communication paths in the flexible array of cables and being indicative of status of the compartments of the vehicle while the vehicle is airborne and without user-visual monitoring capabilities, whereby the first circuit is configured and arranged to receive the status-indication signals from the secondary circuits, and in response thereto, report or analyze the vehicle based on the status of the compartments of the vehicle, as indicated at the distal locations, for a mode relative to travel of the vehicle.

15. The communication circuit of claim 14, wherein the status-indication signals are indicative of an operating function of one or more of: functionality of exterior control surfaces of the vehicle, positioning of wing flaps of the vehicle, alignment of control surfaces of the vehicle, atmospheric conditions of critical surfaces of the vehicle, and position of wheels of the vehicle.

16. The communication circuit of claim 14, wherein the mode relative to travel of the vehicle is at least one of a steady-state movement mode of the vehicle, an acceleration mode of the vehicle, and a deceleration mode of the vehicle.

17. The communication circuit of claim 14, wherein the glass or silica core region has a physical characteristic that is limited by an outer dimension that is less than 750 microns and further including a conductive cladding surrounding the core region.

18. A method for communicating between a plurality of compartments in a vehicle, the method comprising:
providing signal-communication paths via an array of flexible cables between the plurality of compartments in the vehicle, each cable including a glass or silica core region for conveying optical signals;
communicating signals along at least one of the signal-communication paths and between the plurality of compartments in the vehicle, the signals including electrical signals and optical signals; and
utilizing a plurality of circuits including a first circuit located at a proximate location along the array of flexible cables and secondary circuits located at distal locations along the array of flexible cables to communicate status-indication signals between the locations along the array of flexible cables, the status-indication signals being communicated via the signal-communication paths in the flexible array of cables and being indicative of a first vehicle-travel mode for reporting a status of the vehicle in a mode relative to travel of the vehicle, whereby the first circuit is configured and arranged to receive the status-indication signals from the secondary circuits, and in response thereto, report or analyze the vehicle based on the status of the vehicle, as indicated at the distal locations, for a mode relative to travel of the vehicle.

19. The method of claim 18, wherein utilizing the plurality of circuits further includes to determine the vehicle-travel mode being at least one of a steady-state movement mode of the vehicle, an acceleration mode of the vehicle, and a deceleration mode of the vehicle.

20. The method of claim 18, wherein utilizing the plurality of circuits further includes to determine if the status-indication signals are indicative of an operating function of one or more of: functionality of exterior control surfaces of the vehicle, positioning of wing flaps of the vehicle, alignment of control surfaces of the vehicle, atmospheric conditions of critical surfaces of the vehicle, and position of wheels of the vehicle.

\* \* \* \* \*